(12) United States Patent
Tomantschger

(10) Patent No.: US 12,529,160 B2
(45) Date of Patent: Jan. 20, 2026

(54) ARTICLES COMPRISING HETEROGENEOUS AND THERMALLY STABLE GRAIN-REFINED ALLOYS

(71) Applicant: Integran Technologies Inc., Mississauga (CA)

(72) Inventor: Klaus Tomantschger, Mississauga (CA)

(73) Assignee: Integran Technologies Inc., Mississauga (CA)

( * ) Notice: Subject to any disclaimer, the term of this patent is extended or adjusted under 35 U.S.C. 154(b) by 512 days.

(21) Appl. No.: 17/868,409

(22) Filed: Jul. 19, 2022

(65) Prior Publication Data
US 2024/0026559 A1 Jan. 25, 2024

(51) Int. Cl.
C25D 5/10 (2006.01)
C25D 5/00 (2006.01)
C25D 5/16 (2006.01)
C25D 15/00 (2006.01)

(52) U.S. Cl.
CPC ............. *C25D 5/10* (2013.01); *C25D 5/16* (2013.01); *C25D 5/617* (2020.08); *C25D 15/00* (2013.01)

(58) Field of Classification Search
None
See application file for complete search history.

(56) References Cited

U.S. PATENT DOCUMENTS

| | | | |
|---|---|---|---|
| 3,880,725 A | 4/1975 | Van Raalte | |
| 5,314,608 A | 5/1994 | Caballero | |
| 5,538,615 A | 7/1996 | Palumbo | |
| 6,027,631 A | 2/2000 | Broadbent | |
| 6,406,611 B1 | 6/2002 | Engelhaupt | |
| 6,547,944 B2 | 4/2003 | Schreiber | |
| 7,425,255 B2 | 9/2008 | Detor | |
| 7,553,553 B2 | 6/2009 | Palumbo | |

(Continued)

OTHER PUBLICATIONS periodictable.com; (https://periodictable.com/Properties/A/ElectricalConductivity.an.html) (accessed Oct. 7, 2024) (Year: 2024).*

(Continued)

*Primary Examiner* — Elizabeth Collister
(74) *Attorney, Agent, or Firm* — Rankin, Hill & Clark LLP

(57) ABSTRACT

Articles including anisotropic electrodeposited layers of fine-grained alloys of Co, Cu, Fe, Ni and/or Zn with minor additions of B, O, P and S that provide high strength, ductility and heat-resistance, are disclosed as well as a process for making the articles. Non-metallic additions of ≤2% are required to significantly increase the maximum temperature at which softening and grain-growth occurs. Electrodeposition conditions in a single plating cell are adjusted and/or modulated to vary at least one property in the deposit direction and/or along the length and/or width of the workpiece once, constantly or repeatedly, to form a graded and/or layered electrodeposit. Variable property metallic material deposits containing, at least in part, a fine-grained microstructure and variable property in the deposit direction and optionally multi-dimensionally, provide superior overall mechanical properties and temperature stability. Various methods and electroplating apparatuses and approaches to practice the invention are also provided.

26 Claims, 4 Drawing Sheets

(56) References Cited

U.S. PATENT DOCUMENTS

| | | |
|---|---|---|
| 8,025,979 B2 | 9/2011 | Palumbo |
| 8,129,034 B2 | 3/2012 | Palumbo |
| 8,663,819 B2 | 3/2014 | Gonzalez |
| 8,906,515 B2 | 12/2014 | Tomantschger |
| 9,005,420 B2 | 4/2015 | Tomantschger |
| 9,970,120 B2 | 5/2018 | Tomantschger |
| 10,513,791 B2 | 12/2019 | Lomasney |
| 2003/0234181 A1 | 12/2003 | Palumbo |
| 2005/0205425 A1 | 9/2005 | Palumbo |
| 2009/0159451 A1* | 6/2009 | Tomantschger ....... C25D 5/611 |
| | | 205/148 |
| 2010/0304179 A1* | 12/2010 | Facchini ................ C22C 19/07 |
| | | 428/615 |
| 2017/0190921 A1* | 7/2017 | Ul Hamid ............. C23C 28/322 |
| 2018/0327920 A1 | 11/2018 | Tajiri |
| 2019/0127869 A1 | 5/2019 | Tajiri |
| 2020/0131663 A1 | 4/2020 | Jonnalagadda et al. |
| 2020/0190650 A1 | 6/2020 | Tajiri |
| 2020/0291508 A1 | 9/2020 | Tajiri |

OTHER PUBLICATIONS

Bowen Yue, Guangming Zhu, Yanwei Wang, Jianbo Song, Zheng Chang, Nana Guo, Mianguang Xu, Uncertainty analysis of factors affecting coating thickness distribution during nickel electrodeposition, Journal of Electroanalytical Chemistry, vol. 891, pp. 1-12 (Year: 2021).*

International Search Report and Written Opinion of PCT/CA2023/050947 dated Oct. 4, 2023, 9 pages.

International Search Report and Written Opinion of PCT/CA2023/050952 dated Oct. 4, 2023, 9 pages.

Office Action of U.S. Appl. No. 17/868,382 dated Apr. 23, 2025, 40 pages.

* cited by examiner

ARTICLES COMPRISING HETEROGENEOUS AND THERMALLY STABLE GRAIN-REFINED ALLOYS

FIELD OF THE INVENTION

The invention relates generally to an article of manufacture comprising variable property deposits, which contain at least partially grain-refined metallic materials. Preferred metallic materials can comprise fine-grained alloys of Co, Cu, Fe, Ni and Zn, optionally with minor additions of B, O, P and S, optionally also containing solid particulates dispersed therein, that provide high strength, ductility and enhanced stability at high temperature. The invention further relates to an electrodeposition process for fabricating the article in a common plating cell and suitably adjusting the plating conditions to vary at least one property in the deposit direction and/or along the length of the article to synthesize heterogeneous metallic material layers.

BACKGROUND OF THE INVENTION

Various patent filings disclose crystalline metal alloy coatings which are layered and/or graded, i.e., their composition is not uniform in the deposition direction:

Schreiber et al. in U.S. Pat. No. 6,547,944 (2003) describe a method for forming a nano-laminate structure with, e.g., nickel and copper, which comprises plating a substrate with individual layers <100 nm in thickness of substantially a first metal and substantially a second metal using an electrolytic plating process by controlling the plating current.

Detor et al. in U.S. Pat. No. 7,425,255 (2008) teach an electrodeposition process involving bipolar pulsing by varying the polarity ratio to provide graded structures with different grain-sizes and/or compositions solely in the deposition direction. Changing the polarity ratio involves changing amplitude and/or duration of negative portions of a pulse relative to positive portions. Compositions disclosed comprise at least two metals selected from the group consisting of: tungsten, molybdenum, nickel and cobalt.

Tomantschger et. al. in U.S. Pat. No. 9,005,420 (2015), assigned to the same assignee as the present application, disclose a variable property deposit, of at least partially of fine-grained metallic materials, optionally containing solid particulates dispersed therein. The electrodeposition conditions in a single plating cell are suitably adjusted to once or repeatedly vary at least one property in the deposit direction. In one embodiment denoted multidimensional grading, property variation along the length and/or width of the deposit is also provided. Suited metallic materials comprise one or more elements selected from the group consisting of Ag, Au, Cu, Co, Cr, Mo, Ni, Sn, Fe, Pd, Pb, Pt, Rh, Ru, and Zn.

Lomasney et al. in U.S. Pat. No. 10,513,791 (2019) describe electrodeposited nano-laminate coatings of, e.g., nickel and cobalt to improve the properties of tubular items such as those used in oil and gas industry (e.g., casings and drill pipes).

Van Raalte et. al. in U.S. Pat. No. 3,880,725 (1975) describe electrodeposited metal films having a predetermined thickness profile with an apparatus including a plurality of modifying electrodes and a body of plating material suspended in a plating solution. The particular electrical potential at the article, the body of plating material and at each one of the modifying electrodes is chosen to provide differences in electrical potential which result in a metal film having the predetermined thickness profile.

Broadbent in U.S. Pat. No. 6,027,631 (2000) describes an electroplating system including shield(s) placed perpendicular to the electric field to control the thickness profile of a metal electrodeposited onto a substrate. The shield(s) are positioned between the anode and the cathode in a standard electroplating apparatus with a device for rotating the workpiece. The cathode is rotated so that the shield(s) in conjunction with the rotation of the cathode selectively alters or modulates a time average of the electric field characteristics between the anode and the cathode. The modulated electric field is used to control the electrodeposition rate at selected area(s) of the plating surface of the cathode, thereby causing the metal deposited on the cathode to have a modified thickness profile.

Tajiri et. al. in U.S Patent Publication 2018/0327920 (issued as U.S. Pat. No. 11,091,948 (2021)) disclose components which can be formed using an internal monolithic body utilizing electroforming processes such as electrodeposition of metal alloys. The electroformed monolithic body can be formed utilizing multiple anodes powered by multiple power sources. The monolithic body can have differing local material properties determined during formation of the component.

Tajiri et. al. in U.S. Patent Publication 2019/0127869 disclose a forming manifold and method for electroforming a component, including providing an electroforming cathode disposed within a first bath tank having a solution with a first metal ion concentration, overlaying at least a portion of the electroforming cathode with a forming manifold having a housing and applying a voltage to the electroforming cathode while disposed within the first bath tank.

Dattu et. al. in U.S. Patent Publication 2020/0131663 (issued as U.S. Pat. No. 11,142,840 (2021)) disclose an electroforming system for electroforming a component which includes an electroforming reservoir with a housing defining a fluid passage. An electroforming chamber can be located within the housing and fluidly coupled to the fluid passage via a set of apertures in at least one wall of the electroforming chamber.

Electrodeposited metal and alloy coatings comprising Co, Cu, Fe and Ni optionally with minor additions of non-metallic elements are extensively used in consumer and industrial applications. By way of example, Caballero in U.S. Pat. No. 5,314,608 (1994) describes electrodeposited nickel-cobalt-boron alloys consisting of about 49-74% nickel, about 24-49% cobalt, and about 1.9-2.5% boron. Specifically, a dense, smooth, ductile, hard, highly reflective, corrosion-resistant, temperature resistant, and wear-resistant crystalline alloy of nickel, cobalt and boron is disclosed using a pulsed square wave current in an electrolytic bath containing nickel ions, cobalt ions, complexing agents, and an amino borane compound at a low pH level and moderate temperature.

Palumbo et. al. in U.S. Patent Publication 2003/0234181, assigned to the same assignee as the present application, disclose a process for repairing an external surface area of a degraded section of metallic workpieces, especially of tubes and tube sections. Suited electrodeposited metallic coatings contain one or more metals selected from the group consisting of Ag, Au, Cu, Co, Cr, Ni, Fe, Pb, Pd, Pt, Rh, Ru, Sn, Mo, Mn, W, V, and Zn, and additional alloying elements can be selected from the group consisting of B, C, P, S and Si, and can optionally comprise metal matrix composites containing metal powders, metal alloy powders, metal oxides, nitride powders, carbon powders, carbide powders, diamond powders, $MoS_2$ and organic material additions. Working examples disclosed, among others, include grain-refined alloys containing phosphorus additions, including Ni-0.15P (average grain-size: 200 nm, hardness: 300 VHN), Ni-0.2P (average grain-size: 70 nm, hardness: 400 VHN) and Ni-0.6P (average grain-size: 13 nm, hardness: 780 VHN).

Palumbo et. al. in U.S. Patent Publication 2005/0205425, assigned to the same assignee as the present application, disclose a process for forming coatings or free-standing deposits of nanocrystalline metals, metal alloys or metal matrix composites with grain-sizes below 1,000 nm. Suitable electrodeposited metallic coatings contain (a) a pure metal or alloys of metals selected from the group consisting of Ag, Au, Cu, Co, Cr, Ni, Fe, Pb, Pd, Pt, Rh, Ru, Sn, V, W, Zn, or (b) an alloy containing at least one of the elements of group (a) and alloying elements selected from the group consisting of C, P, S and Si. Working examples disclosed, among others, include alloys containing phosphorus additions, including Ni-5.9P (amorphous, hardness: 611 VHN) and Ni-5.9P with 45% per volume $B_4C$ (average grain-size: 12 nm, hardness: 609 VHN).

Palumbo et. al. in U.S. Pat. No. 7,553,553 (2009), assigned to the same assignee as the present application, disclose lightweight articles comprising a polymeric material at least partially coated with a fine-grained metallic material. The fine-grained metallic material has an average grain-size between 2 nm to 5,000 nm, a hardness between 200 VHN and 3,000 VHN, and a modulus of resilience between 0.25 to 25 MPa. Several suitable metal deposition processes can be applied to establish high-strength coatings of pure metals or alloys of metals selected from the group of Ag, Al, Au, Cu, Co, Cr, Ni, Sn, Fe, Pt, Ti, W, Zn and Zr and alloying elements selected from Mo, W, B, C, P, S and Si and metal matrix composites of pure metals or alloys with particulate additives such as powders, fibers, nanotubes, flakes, metal powders, metal alloy powders and metal oxide powders of Al, Co, Cu, In, Mg, Ni, Si, Sn, V, and Zn; nitrides of Al, B, Si and Ti; C (graphite, diamond, nanotubes, Buckminster Fullerenes); carbides of B, Cr, Bi, Si, Ti, W; and self-lubricating materials such as $MoS_2$ or organic materials, e.g., PTFE. Working examples disclosed, among others, include electrodeposited alloys containing phosphorus additions, including Co-2-3% P (average grain-size: 15 nm) and Ni-0.6P (average grain-size: 13 nm, hardness: 780 VHN).

Palumbo et. al. in U.S. Pat. No. 8,129,034 (2012), assigned to the same assignee as the present application, disclose free-standing articles containing fine-grained (average grain-size: 1 nm to 1,000 nm) metallic coatings, optionally containing solid particulates dispersed therein, on various substrates. The electrodeposited coating has a low coefficient of thermal expansion (CTE) matching the CTEs of the substrate to minimize dimensional changes during thermal cycling and prevent premature failure. The fine-grained metallic coating is selected from the group consisting of (i) a pure metal selected from the group consisting of Al, Cu, Co, Ni, Fe, Mo, Pt, Ti and Zr, (ii) an alloy comprising at least two elements selected from the group consisting of Al, Cu, Co, Ni, Fe, Mo, Pt, Ti and Zr; (iii) pure metals or an alloy comprising at least one element selected from the group consisting of Al, Cu, Co, Ni, Fe, Mo, Pt, Ti and Zr, further comprising at least one element selected from the group consisting of Ag, Au, B, C, Cr, Mo, Mn, P, S, Si, Pb, Pd, Rh, Ru, Sn, V, W, and Zn; and (iv) any of (i), (ii) or (iii) wherein said fine-grained metallic coating also comprises particulate additions in the volume fraction of between 0 and 95% by volume. Working examples disclosed, among others, include electrodeposited alloys containing phosphorus additions, including Ni-0.6P (average grain-size: 13 nm, hardness: 780 VHN as plated, 890 VHN after heat-treatment at 400° C. for 20 minutes and 1010 VHN after heat-treatment at 400° C. for 20 minutes, followed by another heat-treatment at 200° C. for 11 hours) and Co-0.8P (average grain-size: 12 nm, hardness: 580 VHN).

Gonzalez et. al. in U.S. Pat. No. 8,663,819 (2014), assigned to the same assignee as the present application, disclose free-standing articles or articles at least partially coated with substantially porosity free, fine-grained and/or amorphous Co-bearing metallic materials optionally containing solid particulates dispersed therein. The electrodeposited metallic layers and/or patches comprising Co provide, enhance or restore strength, wear and/or lubricity of substrates without reducing the fatigue performance compared to either uncoated or equivalent thickness chromium coated substrates. The fine-grained and/or amorphous metallic coatings comprising Co are particularly suited for articles exposed to thermal cycling, fatigue and other stresses and/or in applications requiring anti-microbial properties. Preferred electrodeposited metallic layers comprise cobalt and phosphorus, e.g., alloys of cobalt and P with unavoidable impurities; and cobalt and phosphorus alloys further containing at least one element selected from the group consisting of B, C, H, O, W, Fe, and S.

Tomantschger et. al. in U.S. Pat. No. 8,906,515 (2014), assigned to the same assignee as the present application, disclose metal-clad polymer articles containing structural fine-grained and/or amorphous metallic coatings/layers optionally containing solid particulates dispersed therein. The fine-grained and/or amorphous metallic coatings are particularly suited for strong and lightweight articles exposed to thermal cycling although the coefficient of linear thermal expansion (CLTE) of the metallic layer and the substrate are mismatched. The interface between the metallic layer and the polymer is suitably pretreated to withstand thermal cycling without failure. The fine-grained metallic coating is selected from the group consisting of (i) one or more metals selected from the group consisting of Ag, Al, Au, Co, Cr, Cu, Fe, Ni, Mo, Pd, Pt, Rh, Ru, Sn, Ti, W, Zn and Zr, (ii) pure metals selected from the metals listed in (i) or alloys containing at least two of the metals listed in (i), further containing at least one element selected from the group consisting of B, C, H, O, P and S; and (iii) any of (i) or (ii) where said metallic coating also contains particulate additions in the volume fraction between 0 and 95% by volume.

Tajiri et. al. in U.S. Patent Publication 2020/0190650 (issued as U.S. Pat. No. 11,053,577 (2021)) disclose a nickel-cobalt material and method for forming a doped nickel-cobalt precursor material using phosphorous (as opposed to elemental phosphorus) or boron additions as pinning agents. The method also includes heat-treating the doped nickel-cobalt precursor material below the onset temperature for grain growth, specifically between 600 and 750K (327° C.-477° C.), to form a heat-treated nickel-cobalt material. The heat-treatment forms phosphorous precipitates at nanocrystalline grain boundaries.

Tajiri et. al. in U.S. Patent Publication 2020/0291508 disclose nickel-cobalt materials and methods for thermally stabilizing them. The nickel-cobalt material may include a metal matrix composite with amorphous regions and crystalline regions substantially encompassed by a nanocrystalline grain structure with a grain-size distribution of about 50 nm to about 800 nm. The metal matrix composite is composed of nickel, cobalt, and a dopant such as phosphorus, sulfur and/or boron. The nickel-cobalt material is heat-treated within a first temperature zone below the onset temperature for grain growth and then within a second temperature zone above the onset temperature for grain growth in the material to thermally stabilize the material. According to Tajiri '508, the phosphorus containing dopant is phosphorous which is deposited during the electrodeposition process and dispersed through the crystalline lattice of the nickel-cobalt alloy.

Thus, as indicated by the prior art, there is a particular need for articles containing strong, durable metallic coatings which are heterogeneous and are stable at elevated temperatures. Similarly, there is a need for durable, free-standing metallic materials.

SUMMARY OF THE INVENTION

A variety of articles are made of metallic materials, comprising a grain-refined microstructure are used in conditions where, at times, the articles are subject to brief or prolonged exposure to elevated temperatures. It is known that grain-refined metallic material subjected to elevated temperatures can experience irreversible grain-growth leading to permanent softening of the material and a loss of the mechanical properties. Consequently, means of stabilizing the grain structure to maintain the excellent mechanical properties of grain-refined materials at elevated temperatures are being sought.

In a co-pending application filed concurrently (U.S. Ser. No. 17/868,382), the inventors describe homogenous and layered electrodeposited fine-grained metallic materials comprising Co, Cu, Fe and Ni with minor additions of boron (B), oxygen (O), phosphorus (P) and sulfur (S), totaling between 100-20,000 ppm, that provide high strength and ductility and which can be exposed to elevated temperatures without experiencing irreversible grain-growth. Preferably, at least one metallic element and more preferably at least two metallic elements and most preferably at least three metallic elements are used in the metallic material selected from the group consisting of Co, Cu, Fe, Ni and Zn.

In one aspect, the present disclosure describes heterogeneous electrodeposited fine-grained alloy layers with minor non-metallic alloying additions that are graded and/or layered and/or of non-uniform thickness to further improve strength, ductility, and heat-resistance while optimizing the strength to weight ratio, and methods for forming them.

In another aspect, the present disclosure describes a method of electrodeposition particularly suited to achieve a desired coating thickness distribution along a length of a simple or complex shaped article, wherein the method incorporates deflectors for directing, modifying and controlling the electric field and the throwing power of one or more anodes along the length of a workpiece temporary or permanent substrate.

In yet another aspect, the present disclosure describes a method of electrodeposition wherein the inherent electrical conductivity of a workpiece temporary or permanent substrate and the changing electrical conductivity of an article with increased deposition time and increased coating thickness is used to achieve the desired coating thickness distribution along, e.g., a length of the article with a simple or complex shape.

It is an objective of the present invention to provide metallic materials, comprising a grain-refined microstructure, containing at least one element selected from the group consisting of Co, Cu, Fe, Ni and Zn, preferably at least two elements, i.e., binary alloys, from the group consisting of Co, Cu, Fe, Ni and Zn such as Ni—Fe, Co—Fe, Ni—Co, Ni—Cu, Co—Cu and Ni—Zn which further contain minor additions of non-metallic elements selected from the group consisting of boron (B), phosphorus (P), oxygen (O) and sulfur (S).

It is an objective of the present invention to provide metallic materials, comprising a grain-refined microstructure, containing at least two or three elements selected from the group consisting of Co, Cu, Fe, Ni and Zn, with each metallic element containing at least 5% per weight, preferably at least 7.5% per weight, more preferably at least 10% per weight and most preferably at least 20% per weight and up to 95% of each metallic element. Each metallic element comprises a maximum content of 50% per weight, a maximum of 60% by weight, a maximum of 70% per weight, a maximum of 80% per weight, a maximum of 90% per weight and up to 95% per weight.

It is an objective of the present invention to provide grain-refined metallic materials that contain combined additions of non-metallic elements of between 100 ppm and 20,000 ppm (0.01-2.0% per weight), preferably between 2,500 and 15,000 ppm (0.025-1.5% per weight), preferably between 1,000 and 10,000 ppm (0.1-1.0% per weight) and most preferably between 1,000 and 7,500 ppm (0.1-0.75% per weight), of at least one or two or three or all four elements selected from the group consisting of boron (B), phosphorus (P), oxygen (O) and sulfur (S) to increase the maximum temperature at which irreversible grain-growth and softening occurs.

It is an objective of the present invention to provide grain-refined metallic materials that contain combined additions of between 1,000-20,000 ppm (0.1-2.0% per weight) of P and/or B and/or additions of up to 350 ppm or in excess of 3,000 ppm of O and additions of between 300 ppm and 750 ppm of S. In this invention phosphorus (P) and oxygen (O) are typically not present in the metallic material as deposited or after heat-treatment as a "phosphorous compound" $[PO_3]^{3-}$, in which the atomic ratio between P and O is 1:3, and P has an oxidation state of +III.

It is an objective of the present invention to provide grain-refined metallic materials that, as deposited, contain additions of B, P and S in elemental form that are located in the grains in elemental form as alloying elements as well as at the grain boundaries.

It is an objective of the present invention to provide grain-refined metallic materials containing additions of oxygen with an oxidation state of −II.

It is another objective of the present invention to provide grain-refined metallic materials which, as deposited and after heat-treatment, are low and preferably free of phosphorous and/or phosphite, i.e., the total phosphorous and/or phosphite content is less than 90 ppm, more preferably less than 80 ppm, more preferably less than 75 ppm, more preferably less than 50 ppm and most preferably 0 ppm.

It is a further objective of the present invention to provide grain-refined metallic materials containing at least two non-metallic elements selected from the group consisting of B, P, O and S wherein, in the case of P-alloys, the other non-metallic element additions do not contain B and, in the case of B-alloys, the other non-metallic element additions do not contain P.

It is an objective of the present invention to provide grain-refined metallic materials that, as deposited, contain additions of B, O, P and S that are located in the grains preferably (with the exception of oxygen) in elemental form as alloying elements as well as at the grain boundaries.

It is an objective of the present invention to provide grain-refined metallic materials that contain additions of elemental B, P and/or S having an oxidation state of zero (0), as opposed to being present as a B compound having an oxidation state of I and III, as opposed to being present as a P compound having an oxidation state of I, II, III or V and a S compound having an oxidation state of –II, II, IV and VI.

It is an objective of the present invention to provide grain-refined metallic materials containing additions of oxygen with an oxidation state of –II being typically present as a (partial) metal compound, i.e., a metal oxide $MeO_x$ or a metal oxi-hydroxide $MeO_xH_y$, with x and y typically <1.

It is an objective of the present invention to provide metallic materials, comprising a grain-refined microstructure, having an average grain-size of <1,000 nm, preferably between 2 and 1,000 nm, more preferably between 10 and 750 nm, and most preferably between 25 and 500 nm.

It is an objective of the present invention to provide metallic materials, comprising a grain-refined microstructure, which are capable of operating at temperatures of up to 200° C., preferably 300° C., more preferably 350° C. and most preferably up to 400° C. before a noticeable grain growth occurs, which is defined herein as a loss of hardness of >10% when compared to the hardness of the original material, e.g., as electrodeposited.

It is an objective of the present invention to provide grain-refined metallic materials which are capable of operating at elevated temperatures "as deposited", i.e., without the need to expose them to a special "pinning" heat-treatment prior to use.

It is also an objective of the present invention to provide metallic materials comprising a grain-refined microstructure which, after electrodeposition, are exposed to an optional annealing heat-treatment to further optimize the microstructure and change the mechanical or electrical properties. Annealing is performed preferably in an inert atmosphere (nitrogen, argon) or in a vacuum or even air to increase or reduce hardness, increase ductility and thermal stability, and help minimize internal stresses. Annealing is performed at a temperature range between 10% and 60%, preferably between 20% and 50%, more preferably between 30% and 40% of the melting temperature expressed in Kelvin of the metallic material. Depending on the desired properties, rapid cooling or slow cooling can be employed when removing the metallic materials from the annealing furnace to further influence/optimize the mechanical properties.

It is an objective of the present invention to provide metallic materials, comprising a grain-refined microstructure, having a minimum ductility of the electrodeposit (% elongation in tension) of 1%, preferably 2.5%, more preferably 5.0% and most preferably 7.5%.

It is an objective of the present invention to provide metallic materials, comprising a grain-refined microstructure, which are heterogeneous in composition and/or properties in the deposit direction and/or along a length and width of an article.

It is a further objective of the present invention to provide metallic materials in embodiments which comprise multiple nanometer thick layers that periodically vary in composition and/or average grain-size, electrodeposited from the same electrolyte while suitably varying the electroplating parameters. Such nano-laminates comprise at least 100, preferably at least 1,000 ultra-thin individual layers which may periodically be repeated in a stack forming the electrodeposited metallic layer using a predetermined sequence.

It is an objective of the present invention to provide structurally and/or compositionally modulated grain-refined metallic materials consisting of a plurality of layers forming nano-laminates, wherein each of said layers has a thickness in a range selected independently from about 5 nm to about 250 nm, preferably between 5 nm and 100 nm, each of the directly adjacent sub-layers varying in composition of at least one metallic alloying element and/or by at least one of the non-metallic alloying elements by at least 5%, preferably at least 10% and/or an average grain-size and/or ductility by at least 10%, preferably at least 25%.

It is an objective of the present invention to provide metallic materials, comprising outer layers which have a different composition than the bulk material, e.g., to provide added corrosion and/or erosion resistance of the exposed surface(s) while the bulk material composition is optimized for strength, ductility and temperature stability.

It is a further objective of the present invention to provide metallic materials in embodiments which comprise multiple nanometer thick layers that periodically vary in composition and/or average grain-size electrodeposited from the same electrolyte while suitably varying the electroplating parameters. Such nano-laminates can comprise 25 or more, 100 or more, 500 or more, 5,000 or more, or 10,000 or more distinct individual layers, which may periodically be repeated in a stack forming the electrodeposited metallic deposit using a predetermined sequence. Each of said sub-layers has a thickness in a range selected independently from about 5 nm to about 50 nm, from about 10 nm to about 100 nm, or from about 5 to about 250 nm. The overall thickness of the nano-laminate deposit may vary widely depending on the application of the coatings and may have a thickness in a range selected independently from 1 micron to 100 microns, from 10 to 500 microns, or from 25 microns to 2.5 cm.

It is an objective or the present invention to provide metallic materials wherein each of the directly adjacent sub-layers vary in composition of at least one metallic allying element and/or by at least one of the non-metallic alloying elements by at least 5%, preferably at least 10% and/or an average grain-size and/or ductility by at least 10%, preferably at least 25%.

The present invention describes grain-refined metallic material compositions that comprise phosphorus additions predominantly as alloying agent present in the oxidation state zero (0), as opposed to metallic material compositions, classified herein as metal matrix composites, that contain inorganic phosphorus compounds as precipitates (such as phosphates, phosphorous and phosphites, and hypophosphites) with the oxidation state +V, +III or +I solely at the grain-boundaries of the metal alloy to serve as pinning agents.

It is an objective of the present invention to deposit grain-refined metallic materials onto a workpiece temporary or permanent substrate which, in case it has a poor inherent electrical conductivity such as organic polymers, has been metallized with a thin layer of Cu, Ag, Ni and/or Cu (such as high-P Ni and/or high-P Co) using, e.g., electroless deposition, cold spraying, vacuum deposition, physical or chemical vapor deposition or the like. "High P" is defined herein as having a P content of at least 7.5% per weight. Alternatively, the required electrical conductivity can be achieved by applying conductive paints (organic coating with metal and/or carbon additions).

It is an objective of the present invention to provide grain-refined metallic materials, comprising one or more layers of Cu and/or Ag on top of the metallizing layer to enhance and/or control the electrical conductivity of the workpiece to achieve the desired properties for electrodepositing the grain-refined metallic material layer(s).

It is an objective of the present invention to provide grain-refined metallic materials, comprising multi-layered and/or graded layered electrodeposits.

It is an objective of the present invention to provide one or more electrical contact points in a metallized workpiece, placed strategically to achieve the desired metallic layer dimensions and substructure (composition and grain-size) and use the placement of workpiece electrical contacts and/or anodes to achieve a graded metallic layer even without further modulation of the plating parameters, i.e., use the initial electrical conductivity, particularly laterally, i.e., perpendicular to the ion flow in the electroplating cell, and the change in overall electrical conductivity as the metallic deposit layer thickness increases to produce at least one heterogeneous metallic layer, wherein the thickness of said electrodeposited metallic alloy layer in the deposit direction is in the range of between 25 microns and 2.5 cm and wherein the layer thickness is non-uniform and varies by at least 25 microns and/or at least 10% between the high spot(s) and the low spot(s). Using this approach, the coating thickness desired in selected areas/sections on the workpiece can be increased such as in those areas subject to increased loads. Furthermore, the chemical composition and/or grain-size can be modulated to increase the ductility, e.g., in sections where the article is prone to increased flex during use.

It is another objective of the present invention to provide a electroplating system comprising two or more anode sections, each powered by a separate synchronized power supply to enable independent adjustment of the average applied anode currents, which are separated by electric field deflector/diverter which generally align with the direction of the electrical field to at least partially restrict and divert the electric field and the throwing power and enable deposit thickness control along the length and width/circumference of an elongated workpiece of at least one foot in length. In this context "synchronized power supplies" mean that the on, off and reverse pulse times among the various power supplies are synchronized. Other parameters within the same duty cycle, however, do not necessarily match. For instance, the forward current (and forward current density), reverse current (and reverse current density) as well as the polarity ratio, which is defined as the ratio between the reverse pulse current and the forward pulse current, may or may not be matching. The polarity ratio is typically higher than 1, e.g., a minimum of 1.5, a minimum of 2, a minimum of 3, or a minimum of 5, i.e., the anodic pulse height current is higher than the cathodic pulse height current. The on-time ratio, i.e., the ratio between the reverse pulse on-time and the forward current on-time, however, is always smaller than 1. The on-time ratio is typically below ⅓, below ⅕ or below 1/10.

It is an objective of the present invention to provide strong, ductile, durable, scratch and abrasion resistant, strong, lightweight articles for use in various applications including, but not limited to, transportation applications (including automotive, aerospace, ships and other vessels navigating on land, in air, space and on water, and their components), defense applications, industrial components including, but not limited to, on-shore and off-shore oil and gas exploration and production, building materials, consumer and commercial products, electronic equipment or appliances and their components, sporting goods as well as any other indoor or outdoor equipment which are, at least at times, exposed to above ambient temperatures.

It is an objective of the present invention to provide or coat articles of appreciable size and of complex shape, i.e., having at least one dimension such as the length equal to or exceeding one foot (30.5 cm), preferably ≥2 ft (61 cm), and more preferably ≥3 ft (91.5 cm), with an outer surface area equal to or exceeding 200 $cm^2$, preferably ≥500 $cm^2$ and more preferably ≥1,000 $cm^2$.

It is an objective of the present invention to provide grain-refined metallic materials in free-standing form or as coated articles on suitable permanent substrates.

It is an objective of this invention to provide grain-refined metallic materials in the form of coated articles on metallic material substrates including, but not limited to, Al, Co, Cu, Fe, Ni, Sn, Ti and Zn and their alloys, and/or polymeric material substrates including, but not limited to, ABS, PVC, polyolefins, polyamides and carbon fiber composites, having a "pull-off strength" between the substrate/article and the grain-refined metallic material layer(s) according to standard ASTM 4541D of at least 250 psi (1.73 MPa), preferably at least 300 psi, preferably at least 400 psi, preferably at least 500 psi, preferably at least 750 psi, preferably at least 1,000 psi and preferably at least 1,200 psi.

It is an objective of the present invention to provide grain-refined metallic materials in the form of coated articles for a variety of applications operating at ambient temperatures and/or at elevated temperatures of up to 500° C. including, but not limited to:

aerospace parts and components including, but not limited to, wings, wing parts including flaps and access covers, structural spars and ribs, propellers, rotors and rotor blades, stators and stator vanes, various fluid conduits, manifolds, heat exchanger parts, rudders, covers, fuselage parts, nose cones, and landing gear parts;

automotive components including, but not limited to, heat shields, oil, transmission and brake parts, fluid tanks and exposed housings including oil and transmission pans, spoilers, grill-guards and running boards, vehicle chassis parts including hood, doors and side panels, gas tanks and engine covers;

sporting goods including, but not limited to, hockey sticks, helmets, golf shafts, heads, balls and faceplates, ski and snowboard components including bindings, and bicycle parts;

industrial/consumer products and parts including, but not limited to components used in the oil and gas as well as mineral exploration and production industry, bolts and fasteners, solar panels, turbines and windmills; and components requiring heat-resistant and corrosion resistant coatings.

Accordingly, in one embodiment, the present invention provides for an article comprising a heterogeneous electrodeposited metallic alloy layer or patch, a composition of the metallic alloy layer or patch consisting of:

(i) a microcrystalline grain structure with an average grain-size in the range of 2 to 1,000 nm;

(ii) at least two metallic elements selected from the group consisting of Co, Cu, Fe, Ni and Zn;

(iii) each of said metallic elements comprising at least 5% per weight of the metallic alloy composition;

(iv) at least two non-metallic elements in total comprising between 50 ppm and 20,000 ppm per weight of the metallic alloy composition selected from the group consisting of B, O, P and S;

(v) wherein said heterogeneous electrodeposited metallic alloy layer being compositionally graded and/or layered in the deposition direction; and (vi) wherein the concentration of at least one of the chemical elements varies by at least 5% in the deposition direction and/or along a length of the article.

According to the above embodiment, the hardness of the electrodeposited metallic alloy layer after heat-treatment for 12 hours at a temperature of 100° C. in an inert atmosphere retains at least 90% of the as-deposited hardness.

In another embodiment, the present invention provides for an article, which can have a length of at least one foot, comprising:
  (i) a substrate defining a size and a shape of the article, the substrate comprising a polymeric material with or without particulate addition having an electrical conductivity of ≤1 S/m at 20° C.;
  (ii) at least one electrically conductive metallizing layer in intimate contact with the polymeric material and having a thickness of no more than 12.5 microns and having an electrical conductivity of ≥$10^4$ S/m at 20° C.;
  (iii) optionally at least one electrically conductive intermediate layer in intimate contact with the metallizing layer, the at least one conductive intermediate layer having a thickness of no more than 25 microns and having an electrical conductivity of ≥$10^4$ S/m at 20° C.;
  (iv) a structural metallic material layer in intimate contact with the metallizing layer or, if present, the conductive intermediate layer and having a thickness of at least 25 micron and an electrical conductivity of ≥$10^6$ S/m at 20° C.;
  (v) the structural metallic material layer comprising a heterogeneous electrodeposited metallic alloy layer consisting of:
    (a) a microcrystalline grain structure with the average grain-size in the range of 2 to 1,000 nm;
    (b) at least two metallic elements selected from the group consisting of Co, Cu, Fe, Ni and Zn;
    (c) each of said at least two metallic elements comprising at least 5% per weight of the total metallic alloy composition;
    (d) at least one non-metallic element selected from the group consisting of B, O, P and S;
    (e) said non-metallic elements in total comprising between 50 ppm and 10,000 per weight of the total metallic alloy composition;
    (f) wherein the hardness of said electrodeposited metallic alloy layer after heat-treatment for 12 hours at a temperature of 100° C. in an inert atmosphere retains at least 90% of the as-deposited hardness;
    (g) wherein said heterogeneous electrodeposited metallic alloy layer being compositionally graded and/or layered in the deposition direction; and
    (h) wherein at least one of the chemical elements varies by at least 5% in the deposition direction and/or along a length of the article.

In yet another embodiment, the present invention provides for a method of electroplating a metallic material layer or patch of a desired thickness distribution onto an exposed surface of an elongated temporary or permanent substrate which can be of at least 1 foot in length, the method comprising:
  (i) providing the substrate serving as a workpiece;
  (ii) providing two or more anodes along a length of said substrate;
  (iii) providing a separate electrical contact to each anode to establish at least two electrically independent anode loops;
  (iv) providing a separate power supply module for each anode, and synchronizing said power supply modules with respect to forward-on-times, reverse-on tines and off times;
  (v) connecting each anode to a positive pole of each separate power supply;
  (vi) connecting the substrate to negative poles of all separate power supplies;
  (vii) positioning at least one deflector between adjacent anodes, and positioning said at least one deflector substantially parallel to an electric field between said anodes and said substrate;
  (viii) immersing said anodes, said at least one deflector and said substrate in an electrolytic solution;
  (ix) applying a distinct current profile between each said anodes and said substrate to generate the electric field between said each anode and said substrate, wherein on times, off times, reverse pulse and forward pulse times are synchronized, and wherein at least one of a forward pulse current density and a reverse pulse current density varies between at least two anodes; and;
  (x) wherein said at least one deflector oscillates at a rate of 0-50 oscillations per minute at an angle up to +/−67.5 degrees between a deflector plane and the direction of the electric field.

In yet another embodiment, the present invention provides for a method of electroplating a metallic material layer or patch of a non-uniform thickness distribution onto an exposed surface of a temporary or a permanent substrate that can define a shape and size of an article, the method comprising:
  (i) providing the substrate comprising a polymeric material having an electrical conductivity of ≤1 S/m at 20° C.
  (ii) coating at least part of the substrate with at least one electrically conductive metallizing layer in intimate contact with the polymeric material having a thickness of no more than 12.5 microns and having an electrical conductivity of >$10^4$ S/m at 20° C.;
  (iii) optionally depositing one or more electrically conductive intermediate layer(s) in intimate contact with the metallizing layer, the conductive intermediate layer(s) in total having a thickness of no more than 25 microns and having an electrical conductivity of ≥$10^4$ S/m at 20° C.;
  (iv) immersing said metallized substrate in an electroplating tank containing dissolved metal ions having one or more anodes positioned along the length of said substrate;
  (v) providing at least two separate electrical contacts to said metallized substrate;
  (vi) providing an electrical contact to each anode to establish at least two electrically independent anode loops;
  (vii) providing at least one power supply module contacting each anode and each substrate electrical contact;
  (viii) connecting each anode to a positive pole of a power supply;
  (ix) connecting each substrate contact to a negative pole of a power supply;
  (x) applying a distinct current profile between each anode and substrate contact to generate an electric field between said each anode and said substrate contact; and;
  (xi) electrodepositing a structural metallic material layer onto the metallizing layer or, if present, the conductive intermediate layer(s) of said substrate, said structural metallic layer having a thickness of at least 25 microns and an electrical conductivity of >$10^6$ S/m at 20° C.; and;
  (xii) wherein said structural metallic material layer varies in thickness by at least 5% in the deposition direction along a length of said substrate.

The following further defines the article of the present invention:

Free-Standing Article Specification:

In one embodiment the grain refined metallic layer of the present invention is applied to a temporary substrate which defines the size and the shape of a free-standing article and, after electrodeposition, the metallic layer is separated from the substrate or the substrate is melted, dissolved, decomposed or otherwise removed, to form a free-standing metallic article.

Coating on Permanent Substrate Specification:

In one embodiment the grain-refined metallic layer of the present invention is applied to a metallic substrate. Typical metals and alloys used as substrates comprise at least one element selected from the group consisting of Al, Co, Cr, Cu, Fe, Mg, Ni, Sn, Ti, W, Zn, and Zr.

In another embodiment the grain-refined metallic layer of the present invention is applied to a polymeric material comprising at least one of: (i) thermosets such as unfilled or filled epoxy, phenolic or melamine resins, polyester resins, and urea resins; (ii) thermoplastic polymers such as thermoplastic polyolefins (TPOs) including polyethylene (PE) and polypropylene (PP), polyamides, polyphthalamides, polyphtalates, polystyrenes, polysulfones, polyimides, polybutadienes, polyisoprenes, butadiene-styrene copolymers including acrylonitrile-butadiene-styrene (ABS), polyether-ether-ketone (PEEK), polycarbonates, and chlorinated polymers such polyvinylchloride (PVC).

Fillers used in the polymeric materials can include metals, metal oxides, carbides, carbon (carbon, carbon fibers, carbon nanotubes, diamond, graphite, graphite fibers and graphene), glass, glass fibers, fiberglass, metallized fibers such as metal coated glass fibers, mineral/ceramic fillers such as talc, calcium silicate, silica, calcium carbonate, alumina, titanium dioxide, ferrite, mica, and mixed silicates (e.g., bentonite or pumice).

Substrates/base articles are made or shaped by any convenient manufacturing process. It is desirable to suitably prepare the surface of the substrates/base article before it receives the grain-refined metallic layer. The pretreatment can involve a cleaning step followed by a suitable mechanical or chemical process which increases the surface roughness and enhances adhesion between the permanent substrate and the metallizing layer.

Optional Polymeric Top-Coat Specification:

Optionally, a decorative polymeric top-coat, e.g. paint, or a functional polymeric coating, e.g., hydrophobic and/or icephobic coating can be applied to an exposed surface of the grain-refined metallic layer which does not deteriorate at the maximum operating temperature the article is exposed to. The polymeric coating can contain a curable resin which can be any thermoset resin that can be cured or "set" by crosslinking.

The polymeric coating can also contain an elastomer such as any alkadiene polymer, e.g., neoprene rubber; isoprene rubber; butadiene rubber, polyurethane and the like. Modified epoxies containing rubber or silicone adducts are also suitable.

The polymeric coating can be fiber reinforced. Examples of reinforcing fibers include glass fibers, aramid fibers, carbon fibers, carbon nanotubes, and the like. Other additives can include fluorinated polymers such as polytetrafluoroethylene (PTFE) or fluorinated silicones as well as pigments to provide a coating with any desired color. In general, the resin compositions used for forming the polymeric coating can be cured at temperatures below 150° C. including at room temperature.

Heat-Treatment Test Specification:

In order to quickly and reliably assess the effect of the grain-refined metallic layer composition on the temperature stability of the article a simple, reproducible heat-treatment test is required. It is well known that in the grain-size range of interest (10-1,000 nm average grain-size) there is a linear relationship between the hardness, as e.g., the Vickers hardness measured by indentation, and the inverse square-root of the average grain-size according to the Hall-Petch equation. When the average grain-size increases, e.g., due to grain-growth induced by heat-treatment, the hardness of the material drops accordingly.

It is also known that the average grain-size measurement can depend on the method used for its determination and can be affected by factors such as texture. Therefore, measuring the hardness of a sample of sufficient thickness by indentation is a simple, reproducible and reliable method of keeping track of the physical characteristics of a sample and directly relates to the average grain-size and strength.

Accordingly, a convenient and reliable heat-treatment procedure has been developed and used throughout this work to assess the temperature stability, in which test specimens are exposed to a temperature in the range of about 20-50% of the melting point in Kelvin of the metallic material. Accordingly, an annealing temperature of 350° C. (623K) for 12 hours in an inert atmosphere (vacuum, nitrogen, helium or argon) can be used for metallic alloys having a total combined Ni, Co and Fe content of at least 50% per weight. The heat-treatment temperature may be adjusted, e.g., in the case of metallic materials with a high Cu content (>50% per weight) the heat-treatment may be performed at 200° C. (473K) for 12 hours, and in the case of metallic materials with a high Zn content (>50% per weight) the heat-treatment may be performed at 100° C. (373K) for 12 hours. The Vickers hardness before, i.e., as deposited, and after, i.e., after the heat-treatment, is measured by indentation at room temperature, and the hardness and any change in hardness are recorded.

As many electroplating operations are already equipped for annealing electroplated parts to prevent hydrogen embrittlement, a convenient heat-treatment test can be performed between 175 and 200° C. for between 12 and 24 hrs for all alloys but those containing more than 50% Zn, e.g. 12 hrs at 200° C.

As outlined above, one goal of the present disclosure is to electrodeposit grain-refined Co, Cu, Fe, Ni and Zn containing metallic materials with minor additions of non-metallic alloying agents (B, O, P, and S) which, after being exposed to 12 hrs at a temperature equivalent to about 35%, or between about 20% and 40% of the melting point of the metallic material expressed in Kelvin in an inert atmosphere, retain at least 90% of their as deposited hardness.

Definitions

As used herein, the term "metal", "alloy" or "metallic material" means crystalline and/or amorphous structures where atoms are chemically bonded to each other and in which mobile valence electrons are shared among atoms. Metals and alloys are electronic conductors; they are malleable and lustrous materials and typically form positive ions. Metallic materials include alloys of Ni, Co, Cu and Fe with minor additions of P, S, O and/or B.

As used herein, the term "metal compound" refers to a chemical compound that can contain one or more metallic elements bonded to one or more non-metallic elements. Typically, the metal atom has a positive charge and acts as the cation, typically having a positive valence and not zero (0) as a metallic material. The metal cation in the compound is bonded to a nonmetallic anion, typically an anion having a negative valence, e.g., a halide. Metal oxides such as CuO or metal salts such as $CuCl_2$, $Cu(NO_3)_2$, $CoSO_4$, $CoCl_2$, $CoHPO_3$, $Ni_3(PO_3)_2$, $FePO_4$, $ZnCl_2$ and the like are metal compounds which are not considered a metallic material within the context of this invention. Metal compounds can be soluble or insoluble in electrolyte solutions used in electrodeposition.

As used herein the term "chemical composition" means the chemical composition of the electrodeposited material.

As used herein the term "phosphorus" refers to the chemical element with the symbol P having the atomic number 15 and a valence of zero (0).

As used herein the terms "phosphoric acid" and "orthophosphoric acid" refer to a weak acid with the chemical formula $H_3PO_4$ with phosphorus having a valence of +V.

As used herein the terms "phosphate" and "phosphate-ion" refer to an anion with the chemical formula $[PO_4]^{3-}$ with phosphorus having a valence of +V.

As used herein the term "phosphorous acid" refers to a weak acid with the formula $H_3PO_3$ with phosphorus having a valence of +III.

As used herein the term "phosphite" and "phosphite-ion" refer to anions with the chemical formula $[HPO_3]^{2-}$ or $[H_2PO_3]^-$ with phosphorus having a valence of +III wherein the hydrogen atom is not acidic, being bonded to phosphorus rather than oxygen.

As used herein "phosphorous" and "phosphorous-ion" refer to a chemical composition containing the element phosphorus with a valence or oxidation number of +III, more specifically three oxygen atoms are bound to one phosphorus atom according to the chemical formula $[PO3]^{3-}$.

As used herein the term "phosphorous-free", refers to a material with a phosphorous content of less than 90 ppm, more preferably less than 80 ppm, more preferably less than 75 ppm, more preferably less than 50 ppm and most preferably 0 ppm.

As used herein "hypophosphorous acid" and "phosphinic acid" refer to a weak acid with the chemical formula $H_3PO_2$ with phosphorus having a valence of +I which is an even more powerful reducing agent than $H_3PO_3$. Salts derived from $H_3PO_2$ are called hypophosphites.

As used herein, the term "metal matrix composite" (MMC) is defined as particulate matter embedded in a metallic material matrix that typically do not participate in the electrochemical reactions taking place during the electrodeposition process at the workpiece surface. Particulates additions typically are inert powders added to the electrolyte solution where they get suspended which, when in close proximity to the workpiece surface, can become attached to the workpiece surface, get overplated and thereby become trapped and incorporated in the electrodeposited layer as its thickness increases. Particulates can also be formed in-situ in the electrolyte and/or the workpiece surface by a chemical reaction, e.g., between phosphite and/or phosphorous ions and other ions such as metal ions present in the bath. MMCs can be produced by electrodeposition by suspending particles or adding soluble materials to the electrolyte solution which precipitate at the cathode forming insoluble compounds which are incorporated in the electrodeposited metallic layer deposit by inclusion, e.g., typically at grain-boundaries, but they do not form an alloy with the metallic material. To distinguish the particulate content in a MMC from the alloy composition the particulate content herein is typically expressed in volume percent as frequently, e.g., in the case of hardness and wear performance the volume fraction of the particulates dictates the MMC performance. In contrast, the chemical composition of the alloy herein is typically reported in weight percent, unless otherwise indicated.

As used herein "coarse-grained" defines a metallic microstructure having an average grain-size greater than 1 micron and up to 500 microns.

As used herein "fine-grained" or "grain-refined" is defined as a metallic microstructure having an average grain-size between 2 nm and 1,000 nm.

As used herein "amorphous" defines a metallic microstructure lacking crystallinity characterized by a pattern of constituent atoms or molecules which do not repeat periodically in the three dimensions.

As used herein, the term "grain-size" refers to a size of a set of constituents or components, e.g., the crystallites, included in a material, such as a nanostructured metallic material. Grains/crystallites are attached to each other and are separated by grain boundaries and grains/crystallites are not equivalent to particles, which are independent "unattached" structures, defined by their particle size.

As used herein, the term "particle-size" refers to the size of a free-flowing powder, or granular material, including the particle size of particulate inclusions found in MMCs or wherever distinct particles are found not connected to each other by grain boundaries.

As used herein, the term "substrate" as used herein means a structural member or product that can be used as a base for an article.

As used herein, the term "permanent substrate" refers to a structural member or product that is used as the base for an article that the metallic coating is applied to and that remains attached during its intended use to form a metal-clad article.

As used herein, the term "temporary substrate" refers to a temporary member or product that is used as the base to define the shape and size of an article that the metallic coating is applied to during the electrodeposition process and which, after the metallic coating is applied, is removed and the temporary substrate is no longer present during the intended use of the article.

As used herein, the term "elongated substrate", "elongated article" and "elongated workpiece" means an article having a length exceeding the width thereof, i.e., having an aspect ratio which is the ratio of the length/height to its width/diameter of at least 2:1.

As used herein, the term "electrically conductive" refers to materials such as metals, graphite and conductive polymers which have an electrical conductivity of at least 10 S/m at 20° C. (Nylon: ~10-12 S/m, typical polymers ≤1 S/m, conductive polymers: $10^4$-$10^6$ S/m, graphite: $10^5$ S/m, metals: $\geq 10^7$ S/m).

As used herein, the term "metallic coating" or "metallic layer" means a metallic deposit/layer comprising a metallic material applied to part of or the entire exposed surface of an article.

As used herein, the term "coating thickness" or "layer thickness" refers to depth in a deposit direction.

As used herein, the term "homogeneous layer" refers to a structure that does not change in chemical composition and/or other properties throughout.

As used herein, the term "heterogeneous layer" or "graded layer" refers to a structure where the chemical composition and/or other properties such as the physical structure (thickness, microstructure, etc.) varies through its depth and/or length.

As used herein the term "laminate" or "nano-laminate" means a metallic coating that includes a plurality of adjacent metallic layers that each have an individual layer thickness between 1.5 nm and 1 micron. A "layer" means a single thickness of a substance where the substance may be defined by a distinct composition, microstructure, phase, grain-size, physical property, chemical property or combinations thereof. It should be appreciated that the interface between adjacent layers may not necessarily be discrete but may be blended, i.e., the adjacent layers may gradually transition from one of the adjacent layers to the other adjacent layers.

As used herein, the terms "metal-coated article", "laminate article" and "metal-clad article" mean an item which contains at least one permanent substrate material covered, at least in part, by a metallic layer or patch. In addition to the metallic layer, one or more intermediate structures, such as metalizing layers and polymer layers including adhesive layers, can be employed between said metallic layer or patch and said substrate material.

As used herein, the term "intermediate layer" refers to a relatively thin layer when compared to the structural layer used for a number of reasons, e.g., in applications involving electroplating metallic materials.

As used herein, the term "metallizing layer" refers to an intermediate layer applied to an electrically non-conductive substrate to render it suited for use as an electroplating substrate. Popular metallizing layers include galvanic coatings such as electroless nickel, electroless cobalt and electroless copper, or conductive paints such as polymeric coatings containing conductive additions, e.g., powders of copper, silver and/or carbon/graphite/graphene/carbon nanotubes.

As used herein, "exposed surface" and "outer surface" refer to all accessible surface area of an object or article accessible to the atmosphere and/or a liquid. The "exposed surface area" refers to the summation of all the areas of an article accessible to a fluid.

As used herein, "surface roughness", "surface texture" and "surface topography" mean a regular and/or an irregular surface topography containing surface structures. These surface irregularities/surface structures combine to form the "surface texture".

As used herein the term "smooth surface" is characterized by a surface roughness (Ra) less than or equal to 1 micron.

As used herein, the term "substantially porosity-free," means the metallic coating which has a porosity of less than 1.5%.

As used herein "coating/layer internal stress" or "internal stress" or "residual stress" means an inherent force in an electrodeposit, which free from any external forces, causes the electrodeposit to be either "compressed" or "stretched". In the compressed stressed condition the deposit has the tendency to expand, whereas in the tensile stressed condition the deposit has the tendency to contract. High internal stresses, i.e., stresses equal to or exceeding 2.5 ksi (compressive or tensile) have heretofore been considered to be undesirable as they have been attributed to compromise the corrosion performance due to cracking and flaking and furthermore to also compromise fatigue strength.

As used herein "tensile stress", signified by a positive value, causes the plated strip to bend in the direction of the anode whereas "compressive stress", signified by a negative value, causes the plated strip to bend away from the anode.

As used herein "fatigue" is the progressive and localized structural damage that occurs when a material is subjected to cyclic loading and the "fatigue life" is the number of stress cycles that a specimen can sustain before failure.

As used herein "unavoidable impurities" refer to elements built into the metallic deposit originating from impurities present in the bath, i.e., substances not purposely added to the electrolyte, e.g., bath chemical impurities (such as Ni in Co salts and Co in Ni soluble anodes), or substances inadvertently introduced into the bath (such as Cu from bus bar corrosion and Fe from corrosion of part-racks or tank liners). Total unavoidable impurities typically amount to ≤1% of the metallic deposit.

As used herein the term "average cathode current density" ($I_{avg}$) means the "average current density" resulting in depositing the metallic material and is expressed as the means of the cathodic minus the reverse charge, expressed in mAxms divided by the sum of the on-time, off-time and reverse time expressed in ms, i.e., $I_{avg}=(I_{peak} \times t_{on} - I_{reverse} \times I_{on})/(t_{on}+t_{an}+t_{off})$; where "x" means "multiplied by".

As used herein the term "forward pulse" means cathodic deposition pulse affecting the metallic deposit on the workpiece and "forward pulse on time" means the duration of the cathodic deposition pulse expressed in ms: $t_{on}$ As used herein the term "off time" means the duration where no current passes expressed in ms: $t_{off}$.

As used herein the term "reverse pulse on time" means the duration of the reverse (=anodic) pulse: $t_{an}$.

As used herein "electrode area" means the geometrical surface area effectively plated on the workpiece which can be a permanent substrate or a temporary cathode expressed, e.g. in $cm^2$.

As used herein the term "peak forward current density" means the current density of the cathodic deposition pulse expressed in $mA/cm^2$: $I_{peak}$.

As used herein the term "peak reverse current density" means the current density of the reverse/anodic pulse expressed in $mA/cm^2$: $I_{reverse}$ or $I_{anodic}$.

As used herein the term "duty cycle" means the cathodic on time divided by the sum of all times (on time, off time and anodic time (also referred to as reverse pulse on time)).

As used herein the term "throwing power" is a measure of an electroplating solution's ability to plate to a uniform thickness over an irregularly shaped cathode.

As used herein the term "electric field" is defined as a directional force created when a potential difference is applied between the cathode and the anode separated by some distance and immersed in an electrolyte solution. The electric field can be visualized by electric field lines which follow the direction of the electric field in the electrolyte solution.

As used herein the term "deflector" means an electrically non-conductive barrier which is inserted into the plating tank between the workpiece and the anode(s) to restrict and/or direct the electric field and the throwing power between the workpiece and anode(s).

Moreover, any term of degree used herein, such as "substantially" and "approximately", means a reasonable amount of deviation of the modified word is contemplated such that the end result is not significantly changed.

BRIEF DESCRIPTION OF THE DRAWINGS

The features and advantages of the present invention will be appreciated upon reference to the following drawings, in which.

DETAILED DESCRIPTION OF THE INVENTION

It is known that heterogeneous, e.g., graded and/or layered, metallic materials can provide properties unachievable with uniform, homogeneous structures.

It is well known that alloying can be used to prevent some grain growth at elevated temperatures and/or to increase the temperature at which grain growth occurs.

It is also well known that, among other, pinning agents located at grain-boundaries can be incorporated into nanocrystalline metallic materials to prevent grain growth at elevated temperatures and/or to increase the temperature at which grain growth occurs.

Tajiri et. al. in U.S. Patent Publication 2020/0190650, cited above, disclose a nickel-cobalt precursor material using phosphorous or boron as pinning agents. After electrodeposition, Tajiri's material needs to be heat-treated in a temperature zone below the onset temperature for grain growth such as between 600 and 750K (327° C. to 477° C.), to achieve the desired properties.

Figure 2:
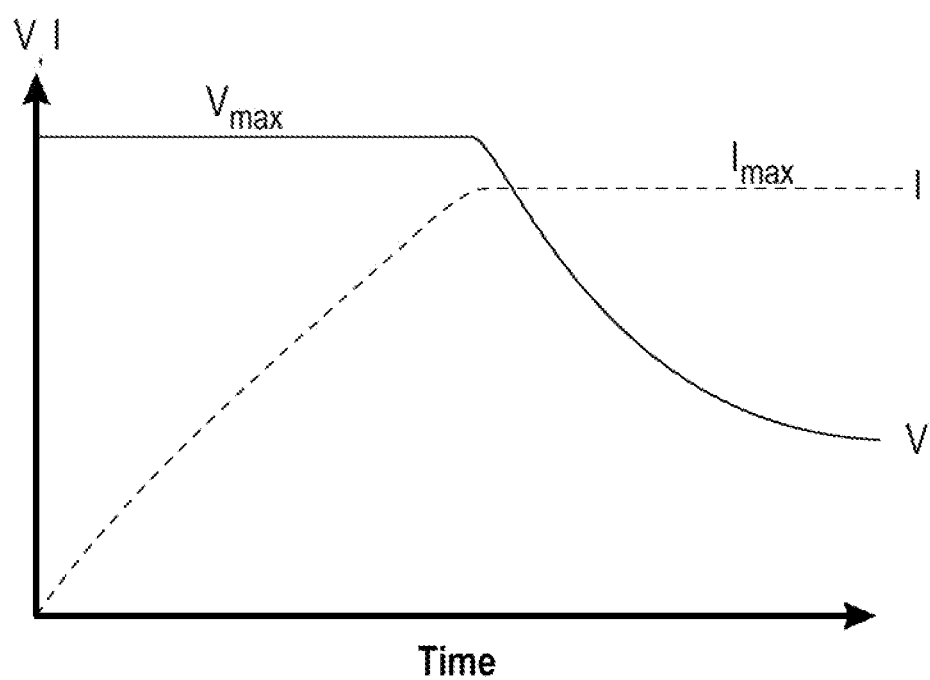
FIG. 2 is a schematic voltage and current profile with time according to one embodiment of the invention.

In paragraph [0030] of Tajiri '650 phosphorous precipitates, which are included within the nickel-cobalt materials, are described, disclosing that the phosphorous precipitates 120 are located at the grain boundaries 106 and are illustrated in, e.g., FIG. 2 of Tajiri '650.

In paragraph [0035] of Tajiri '650 the phosphorous source for the electrodeposition bath is disclosed as including hypophosphorous acid or a hypophosphite salt, e.g., exemplary hypophosphite salts include sodium hypophosphite, potassium hypophosphite, nickel hypophosphite, or ammonium hypophosphite, or other hypophosphite salts of alkali or alkaline earth metals, as well as combinations of these.

The nickel-cobalt material taught in Tajiri '650 can contain between 30 and 35 atomic percent Co and between 100 ppm and 3,500 ppm by atomic weight of phosphorous, and the entire remaining balance being nickel; or the concentration of nickel in the nickel-cobalt material can be from about 60% to about 80% by atomic weight. The concentration of cobalt in the nickel-cobalt material 100 can be from about 20% to about 50% by atomic weight and the concentration of the phosphorous in the nickel-cobalt material from about 500 ppm to about 2,000 ppm by atomic weight.

Tajiri '650 discloses formulations containing between 30.1 and 35.1% per weight Co, between 64.9 and 69.5% per weight of Ni, between 264 ppm and 1,842 ppm per weight P, and between 408 ppm and 2,856 ppm per weight of O, with O and P forming exclusively a "phosphorous compound" located at the grain boundaries, with O having an oxidation state of −II, P having an oxidation state of +III, the O to P weight ratio is fixed at 1.55 (and the O to P atomic ratio fixed at 3/1).

There does not seem to be agreement with respect to where minor non-metallic additions are located within the microstructure of a grain-refined Ni and/or Co alloy. Tajiri '650, relying on the negligible solid solubility of P (elemental or its compounds) in Ni and/or Co under equilibrium conditions, is suggesting the phosphorous compounds of Tajiri '650 are confined solely to the grain boundaries. During pulsed electrodeposition, as practiced by Integran Technologies Inc. of Mississauga, Ontario, Canada (the assignee of the present disclosure), which typically uses relatively high current densities, however, processing conditions can be maintained which are nowhere near equilibrium conditions. While not wishing to being bound by any theory, the inventors submit that, when using electroplating according to this Application, reduction of B, P and S to their elemental form and incorporation of minor amounts of these non-metallic elements can occur on any free metal workpiece surface, i.e., both in the grains and at the grain boundaries, in contact with and wetted by the electrolyte containing ions of the metal and the non-metallic elements available for cathodic reduction. The inventors submit that, in the as-deposited condition, B, P and S may be present in metastable solid solutions in Ni and/or Co alloys. Once the as-deposited grain-refined layer is annealed, however, the thermal activation for segregation to the grain boundaries is provided and upon annealing, the precipitation of second phase particles of P (B, S and the like) occurs and, only after a sufficient heat-treatment, those elements then may increasingly accumulate at the grain boundaries.

Tajiri et. al. in U.S. Patent Publication 2020/0291508, also cited above, disclose a nickel-cobalt precursor material using, among other, phosphorus or boron additions as pinning agents or dopants. After electrodeposition, Tajiri 508's material needs to be initially heat-treated within a temperature zone below the onset temperature for grain growth such as between 600 and 750K (327° C. to 477° C.), followed by a second heat-treatment within a temperature zone above the onset for grain growth such as between 800K and 900K (527° C. to 627° C.) to thermally stabilize the material. The nickel-cobalt material contains between 30% and 50% per weight cobalt, and the concentration of the dopant is in the range of 1,000 ppm to about 2,500 ppm by weight.

In paragraph [0028] of Tajiri '508 a total of 40 suited dopants are listed, i.e., half of the stable elements (5 of which are inert gases) in the periodic system are identified to include aluminum, antimony, arsenic, boron, beryllium, cadmium, carbon, chromium, copper, erbium, europium, gallium, germanium, gold, iron, indium, iridium, lead, magnesium, manganese, mercury, molybdenum, niobium, neodymium, palladium, phosphorus, platinum, rhenium, rhodium, selenium, silicon, sulfur, tantalum, tellurium, tin, titanium, tungsten, vanadium, zinc, and/or zirconium and particularly suitable dopants are identified to include phosphorous $[PO_3]^{3-}$ and/or boron. Tajiri '508's dopants comprise metals, non-metallic elements and chemical compounds.

In paragraph [0037] of Tajiri '508 the "precursor material", i.e., the term used for the as-electrodeposited metallic material upon removal from the electroplating solution, including a phosphorous dopant is described. According to Tajiri '508, during the electrodeposition process, the phosphorous dopant is deposited and dispersed through the crystalline lattice of the nickel-cobalt alloy. Heat-treating the precursor material may form nickel-phosphorous and cobalt-phosphorous precipitate alloys. The nickel-phosphorous precipitates may include nickel phosphide ($Ni_3P$) and the cobalt-phosphorous precipitates may include cobalt phosphide ($Co_2P$). Some of the phosphorous alloys precipitate at grain boundaries and/or migrate to grain boundaries. According to Tajiri '508 such precipitates act to prevent the motion of grain boundaries by exerting a pinning pressure which counteracts the driving force of the grain boundary, thereby inhibiting grain growth. Such pinning may inhibit grain growth during heat-treatment, which may increase formation of intragranular twinning, thereby allowing for heat-treatment that improves ductility while preserving tensile strength. Additionally, such pinning may inhibit grain growth under high temperature and/or high stress operating conditions, providing thermal stability for components formed of the phosphorous-doped nickel-cobalt alloy disclosed in Tajiri '508.

It is clear that Tajiri 508's materials always comprise phosphorous $[PO_3]^{3-}$, i.e., phosphorous is present in the as-deposited, precursor material as evidenced in Example 1, Table 1 and phosphorous is still present after heat-treatment as evidenced in Example 3, Table 3. Therefore, in contrast to the material disclosed in the present Application, the materials disclosed in Tajiri '508 are never "phosphorous-free" and in paragraph [0052] Tajiri '508 discloses the concentration of the phosphorous in the nickel-cobalt alloy may be from about 100 ppm to about 20,000 by weight. FIG. 7 of Tajiri '508 shows a schematic illustration of an exemplary multi-modal composite matrix 700 comprising phosphorous precipitates 708.

In contrast to Tajiri '508's teachings it is also well known that elemental phosphorus can be used as an alloying agent in metallic materials, most notably Ni, Co, Cu, Fe and/or Zn based alloys, i.e., by using electrodeposition conditions as practiced by the assignee of this Application, Integran Technologies Inc., as highlighted in the discussion of the Background. Popular alloys can contain between 2 and 20% per weight of phosphorus and, depending on the alloy and the phosphorus content, many of these alloys are amorphous such as galvanically deposited, e.g., electrodeposited or electroless deposited, Ni and/or Co with about 4-25% P.

Additional popular low-P containing alloys are described by Gonzalez et. al. in U.S. Pat. No. 8,663,819 (2014), cited above, prepared by DC or pulse plating containing nanocrystalline Co with 2±1% per weight of P and unavoidable impurities totaling less than 1%, with an average grain-size in the 5-25 nm range, an internal deposit tensile stress of 15±5 ksi and an as-deposited Vickers hardness of 570±40 VHN and are specified in MIL-DTL-32502 and AMS 2428. The Co—P deposit can be heat-treated for 4 hrs in a temperature range of between 175-200° C. to prevent hydrogen embrittlement and, optionally a further heat-treatment can be employed to increase the deposit Vickers hardness to 640±40 VHN.

Structural Metallic Layer Description:

As described in the co-pending application (U.S. Ser. No. 17/868,382), grain-refined electrodeposited metallic materials comprising at least one, two or more elements selected from the group consisting of Co, Cu, Fe, Ni and Zn can be produced which are strong and ductile. Preferred Co, Cu, Fe, Ni and/or Zn-bearing coatings comprise Co in the range of about 10 to 90 weight percent; Cu in the range of about 5 to 75 weight percent, Fe in the range of about 5 to 75 weight percent, Ni in the range of about 10 to 90 weight percent, Zn in the range of about 5 to 95 weight percent and B, 0, P and/or S combined in the range of about 0.01 to 2.0 weight percent. In addition, embedded in the fine-grained Co, Cu, Fe, Ni and/or Zn comprising coating can be one or more particulates representing between 0-50% per volume of the total metal matrix composite.

Adding particulates to the electrolyte which are not cathodically reduced, however, get to become incorporated into the metallic layer by entrapment/co-deposition forming metal matrix composites, was found to further enhance the temperature stability and can be used as a strategy to lower the content of the non-metallic additions of B, O, P and/or S. Suited particulate additions include, but are not limited to, filler additions that may include metals (Ag, Al, Cr, In, Mg, Mn, Mo, Si, Sn, Pt, Ti, V, W, Zn); metal oxides ($Ag_2O$, $Al_2O_3$, $MnO_x$, $SiO_2$, $SnO_2$, $TiO_2$, ZnO); carbides of B, Cr, Bi, Si, W; carbon (carbon, carbon fibers, carbon nanotubes, diamond, graphene, graphite, graphite fibers); glass; glass fibers; fiberglass metallized fibers such as metal coated glass fibers; mineral/ceramic fillers such as talc, calcium silicate, silica, calcium carbonate, alumina, titanium dioxide, ferrite, mica and mixed silicates (e.g. bentonite or pumice).

Minimum particulate fraction (% by volume or weight in the metal matrix composite): 0; 1; 1.5; 2.5, 5; 10.

Maximum particulate fraction (% by volume or weight in the metal matrix composite): 50; 75; 95.

The inventors of this Application have surprisingly discovered that the temperature stability, i.e., the temperature at which irreversible grain-growth in grain-refined metallic materials occurs can surprisingly be increased by the addition of at least one element, preferably at least two elements from the group consisting of boron, phosphorus, oxygen and sulfur in combined concentrations below 2% or 1% per weight. Unlike materials disclosed in both Tajiri's '650 and Tajiri's '508 which always comprise phosphorous, the phosphorous-free materials described in this Application can be deployed in the "as-deposited" condition and do not require the additional one or two heat-treatments specified by the noted disclosures of Tajiri to alter the microstructure to achieve the desired material properties.

The inventors note that there appears to be a symbiotic relationship between phosphorus and sulfur additions which allows the combined phosphorus and sulfur content to remain below 1% per weight, typically below 0.75% per weight (7,500 ppm) and more typically below 0.5% per weight (5,000 ppm). In the case of sulfur additions to be effective in increasing the onset temperature for grain growth the S content needs to be at least 100 ppm, preferably at least 250 ppm, preferably at least 300 ppm, more preferably at least 350 ppm and most preferably at least 400 ppm. The maximum sulfur content may be limited to 1%, preferably to 5,000 ppm, more preferably 2,500 ppm, and most preferably to 1,000 ppm. It has surprisingly been found that the addition of sulfur in these low concentrations does not notably compromise the mechanical and chemical properties, including, but not limited to, the ductility and the corrosion behavior.

It has surprisingly been found that the addition of carbon, on the other hand, in these low concentrations does not notably improve the thermal stability. In fact, carbon additions of up 2500 ppm were found not to affect the temperature at which grain-growth commenced, while the ductility was significantly reduced. There were, however, slight differences in the rate of grain growth and metallic materials with higher carbon content tend to maintain somewhat smaller grain-sizes. As carbon provides no notable benefit to temperature stability and mechanical and chemical properties, the carbon content in the metallic material is preferably kept low, e.g. below 2,500 ppm, preferably below 1,000 ppm, more preferably below 500 ppm and even more preferably below 350 or even 100 ppm. The carbon content of the metallic materials of this specification, if any, is captured within the umbrella of "unavoidable impurities".

The inventors of this Application have surprisingly discovered that, in addition to alloying and/or incorporation of particulates to form metal matrix composites (MMCs), as described in the above noted co-pending application, the temperature stability of grain-refined metallic materials can further be enhanced by grading or layering in the deposition direction and/or along another direction such as its length or width.

Articles or coatings according to the invention can be formed by incorporating suitable metallic compositions and/or metal compounds in the form of particulates, including, but not limited to, powders, fibers, and shavings, into the metallic coatings which are applied onto permanent or temporary substrates. Suited permanent substrates include a variety of metal substrates, carbon-based materials selected from the group of graphite, graphite fibers and carbon nanotubes, and polymer substrates, commonly referred to as "plastics".

Figure 1:
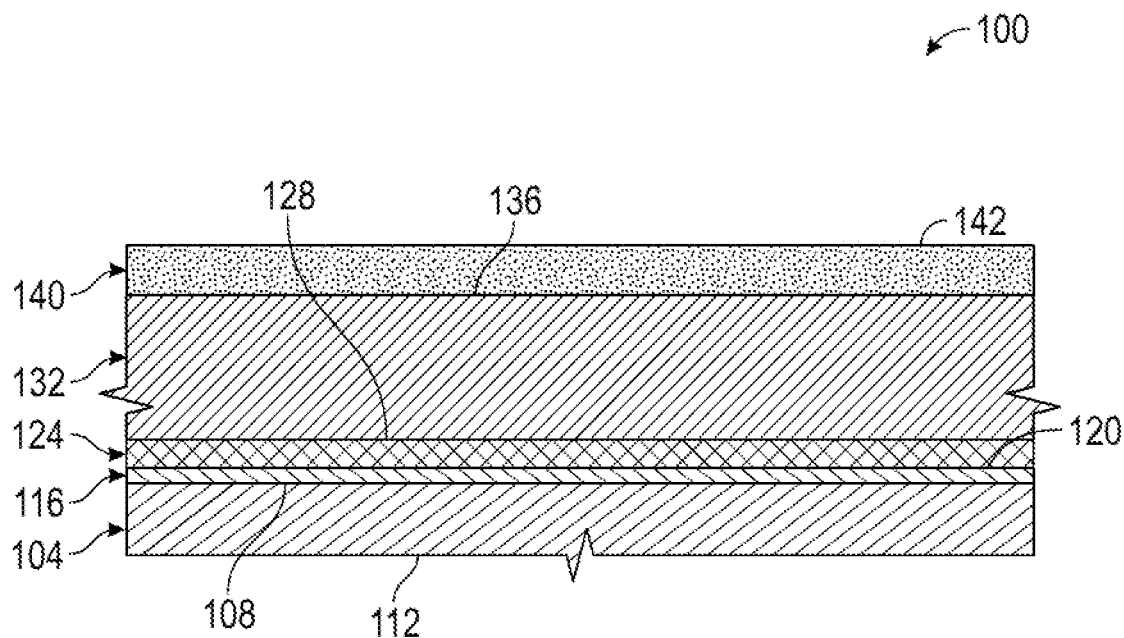
FIG. 1 is a conceptual cross-sectional view of an exemplary article including a substrate coated with a plurality of metallic layers according to the present invention.

FIG. 1 depicts a conceptual cross-sectional view, in the deposition direction, of an examplary article 100 including a temporary or permanent substrate 104 coated with a plurality of conductive layers. The temporary or permanent substrate 104 has a first surface 108 (i.e., an outer exposed surface) and a second surface 112 (i.e., an inner surface). Optionally, applied on top of first surface 108 is a thin metallizing layer 116, having an outer surface 120. Optionally, applied on top of outer surface 120 is a thin metallic conductive layer 124 having an outer surface 128. Applied on top of the outer surface 128 is the grain-refined, thermally-stable, structural layer 132 having an outer surface 136. Optionally, on top of outer surface 136 a decorative and/or functional layer 140 can be applied having an outer surface 142.

Electroplating/Electroforming Process Description:

The electroplating process for plating grain-refined metallic materials described herein includes the steps of: (i) providing a part including a temporary or a permanent substrate having one or more surfaces to be plated, (ii) degreasing the surface(s) of the part and, if desired, optionally masking selected areas of the surface(s) not to be plated, (iii) activating the surface(s) to be plated, (iv) optionally applying intermediate layers and (v) suitably coating the surface(s) to be coated with one or more electrodeposited layers of fine-grained Co, Cu, Fe, Ni and/or Zn comprising metallic materials.

In the case of using a metallic substrate, its surface is typically suitably activated using a mineral acid etch, a plasma or oxidizing gas etch, and/or other surface preparation methods well known in the art. The pretreatment process steps and conditions are varied depending on the chemical composition of the substrate. Due to the high electrical conductivity of metallic materials (typically $\geq 10^4$ S/m at 20° C.) the desired coating can be electroplated directly onto the substrate.

In the case of using a poorly conductive substrate made, e.g., out of a polymeric material with or without particulate addition (electrical conductivity of $\leq 1$ S/m at 20° C.), the substrate is rendered suitable for electroplating by (i) degreasing the surface(s) of the part and, if desired, masking selected areas of the surface(s) not to be plated, (ii) activating the surface(s) to be plated and depositing an electrically conductive metallizing layer in intimate contact with the polymeric material having a thickness of no more than 12.5 microns and having an electrical conductivity of $\geq 10^4$ S/m at 20° C. such as electroless (amorphous) Ni-5-15% P, electroless (amorphous) Co-5-15% P, electroless Cu or conductive paints such as conductive carbon paints (carbon black, graphite, graphene, carbon nanotubes), metals (silver, copper) filled conductive paints and the like (iii) optionally applying one or more electrodeposited electrically conductive intermediate layer(s) in intimate contact with the metallizing layer (e.g., Cu, Ag, Ni), the conductive intermediate layer or layers in total having a thickness of no more than 50 microns, preferably no more than 25 microns and having an electrical conductivity of $\geq 10^4$ S/m at 20° C. and (iv) suitably electrodepositing one or more layers of fine-grained Cu, Co, Fe and/or Ni comprising metallic materials on the surface(s) to be coated.

While all electroless Ni deposits containing between 8-15% P are amorphous, electroless copper deposition is initiated on the randomly distributed catalyst particles on the substrate and the morphology, such as the initial grain structure, is largely determined by the morphology or the substrate surface and the bath formulation and the grain structure changes as the deposit thickness increases. It is believed that, initiating at least close to the catalytic sites on the substrate where the Cu deposition occurs, fine-grained Cu films are formed.

Optionally, one or more thin layers called "intermediate conductive layers" can be applied prior to applying one or more grain-refined metallic layers of the invention. The intermediate conductive layers or structures include metallic layer comprising Co-, Ag-, Ni-, Zn-, Sn- or Cu-strikes or a combination of any two or more of these, and the intermediate conductive layer or structure can be deposited by electrodeposition, electroless deposition, sputtering, thermal spraying, chemical vapor deposition, physical vapor deposition or by any two or more of these. Intermediate conductive layers can also comprise polymeric coatings comprising additions of conductive fillers such as metals or conductive carbon materials (carbon black, graphite, carbon nanotubes and graphene), i.e., conductive paints. Conductive paints represent an elegant metallization technique as no pretreatment of the temporary substrate is required and, after plating the metallizing layer can optionally be removed by dissolution in a suitable solvent or melting/thermal decomposition by a subsequent heat-treatment.

In the case of electroforming, after removal of the temporary substrate, the grain-refined, structural metallic layers represent a minimum of 75%, preferably at least 80% and more preferably at least 95% of the total weight of the resulting article.

A person skilled in the art of electroplating will know how to generally electroplate selected grained-refined metallic materials, including alloys or metal matrix composites comprising at least one element selected from the group consisting of Co, Cu, Fe, Ni and Zn with minor additions of at least one, preferably at least two, non-metallic element selected from the group consisting of B, O, P, and/or S, choosing suitable plating bath formulations and plating conditions as available from Integran Technologies Inc. and other vendors. In the case of tank plating, the part(s) to be plated are submerged into the plating solution containing metal-ions and sources of B, O, P, and/or S containing donor-compounds to be deposited, providing one or more dimensionally stable anode(s) (DSA) or one or more soluble anode(s) (SA), providing for electrical connections to the cathode(s)/workpiece(s) and anode(s) and applying direct and/or pulsed current to coat the surface of the workpiece(s) with a grain-refined metallic material coating; removing the part from the tank, washing the part; optionally baking the plated part to reduce the risk of hydrogen embrittlement and/or optionally heat-treating the part to harden the grained-refined metallic materials coating, optionally polishing or buffing the surface and optionally applying other coatings, e.g., protective or decorative paints or waxes.

Dimensionally stable anodes (DSA) and/or soluble anodes (SA) can be used. Suitable DSAs include platinized metal anodes, platinum clad niobium anodes, iridium oxide coated titanium anodes, graphite or lead anodes or the like. Soluble anodes include Co, Cu, Fe, Ni and Zn metal or their alloy rounds placed in suitable anode basket made, e.g., out of Ti, and covered by suitable anode bags. Where possible the use of soluble anodes is preferred as, unlike when using DSAs, metal-ions lost from the electrolyte through reduction to form the coating on the cathode get replenished by metal rounds which are anodically dissolved. Further benefits of using soluble anodes include a substantial reduction in the cell voltage due to the potential difference between metal-oxidation and oxygen evolution and hence generally a much simpler bath maintenance. In some instances, due to the mismatch between anodic and cathodic current efficiencies, which result in a build-up of metal-ions in the electrolyte, the preferred choice of anodes, however, are DSAs, e.g., in the case of Zn-alloys such as Zn—Ni, Zn—Cu, Zn—Fe and Zn—Co.

In one preferred embodiment at least two metals consisting of the group of Co, Cu, Fe, Ni and Zn are electrodeposited and soluble anodes for each of the metal of choice can be employed and, using several power supplies, the anodic current to each soluble anode can be regulated independently to oxidize and dissolve the desired amount of the metal in question commensurate with the amount of said metal deposited on the workpiece to keep the ion concentration of said metal relatively constant in the electrolyte solution over the duration of the entire electroplating process.

Specifically, preferred Co, Cu, Fe, Ni and/or Zn-bearing plating solutions can include one or more dissolved Co, Cu, Fe, Ni and/or Zn-bearing compounds including their sulfates (e.g., $CoSO_4 \cdot 6H_2O$) or their chlorides (e.g., $NiCl_2 \cdot 6H_2O$) with a preferred concentration range of $Me^{++}$ ions between 10 g/L (or mol/L) and 100 g/L (or mol/L). Other salts can be used as sources for the Co, Cu, Fe, Ni and/or Zn-bearing metal ions including, but not limited to, carbonate, citrate, phosphate and phosphite.

The Co, Cu, Fe, Ni and/or Zn-bearing plating solution can also contain one or more sources of B, which dissolve in the electrolyte including, but not limited to, sodium borohydride ($NaBH_4$), boric acid ($H_3BO_3$), amine-boranes such as borane dimethylamine, in a concentration in the range of between 0.1 to 50 g/L or mol/L. B-ions can get cathodically reduced to elemental B (oxidation state 0) which gets co-deposited by electrochemical reduction into the metallic material forming an alloy, i.e., best described as a solid solution which is metastable at room temperature. The hardness of, e.g., Ni—B coatings, can be increased by the heat-treatment between 280 and 600° C., producing crystalline phases of Ni and intermetallic $Ni_3B$. In $Ni_3B$ both elements having an oxidation state of 0, and annealing can lead to a slight increase in hardness after the heat-treatment when compared to the as-deposited material.

The Co, Cu, Fe, Ni and/or Zn-bearing plating solution can also contain one or more sources of P, e.g., as hypophosphorous acid ($H_3PO_2$), phosphorous acid ($H_3PO_3$) and/or ortho-phosphoric acid ($H_3PO_4$), and/or their salts which dissolve in the electrolyte, with a P concentration in the range of between 0.5 to 100 g/L or mol/L. Hypophosphites, which are soluble in the electrolyte, were found to be particularly suited P-donors.

Unlike the disclosures of Tajiri '650 and Tajiri '508, where P in the cathodic deposit with an oxidation state of +III is always present in the form of phosphorous, suitable electroplating conditions are selected to ensure P in the metallic deposit of this Application is not forming a compound with O, and the O/P atomic ratio is independently variable, i.e., it is not fixed at 3:1 (3.0) as in the disclosures of Tajiri '650 and Tajiri '508, but the O/P atomic ratio can be at or below 8:3 (2.67) or at or above 10:3 (3.33). The material described herein may contain nickel phosphide ($Ni_3P$), nickel oxide ($NiO_x$ and/or $NiO_xH_y$), cobalt phosphide ($Co_2P$) and cobalt oxide ($CoO_x$ and/or $CoO_xH_y$), with x and y typically being between 0 and 1.

Unlike the materials of Tajiri '650 and Tajiri '508, the metallic deposits prepared in accordance with this Application do not require a heat-treatment at a temperature below the onset of grain growth and at times a second heat-treatment at a temperature above the onset of grain growth to achieve the desired composition, microstructure and properties, but can be readily deployed in the "as deposited condition". This feature is of particular importance when using permanent polymeric substrates which, when heat-treated at temperature in accordance with prior art teachings, would deteriorate, decompose or melt.

Without being bound to any theory, it is submitted that in the materials of this invention between 300 and 375° C., in the case of electrodeposited Ni-ultra-low-P alloys, a crystalline mixture of nickel and $Ni_3P$, an intermetallic solid solution of Ni and P, with both elements having an oxidation state of zero (0), is formed which can lead to a slight increase in hardness of the heat-treated, when compared to the as-deposited material.

As the Co, Fe, Ni and/or Zn-bearing plating solutions are aqueous solutions they contain oxygen bound in water. When employing reverse pulse plating, i.e., adding anodic pulses to the cathodic pulses which deposit the metallic material by electrochemical reduction at the workpiece surface, during the anodic pulse oxidation occurs at the metallic layer surface which results in oxidation and dissolution of the metallic component, however, it also results in some metal oxide formation which can be at least partly preserved by the rapidly following cathodic pulse in which new metal deposition from the electrolyte solution competes with the reduction of the surface oxide formed during the anodic pulse. The longer (e. g., measured in ms) and steeper (e.g., measured in $mA/cm^2$) the anodic pulse, i.e., the greater the anodically applied charge during the reverse pulse cycle, the more O is retained in the metallic material typically at or near the grain boundaries. Using reverse pulsing over 1% of O can readily be incorporated into the metallic material. While an oxygen content as low as 100 ppm can have a beneficial effect on temperature stability, in the temperature range of interest (e.g., 300-450° C. for Ni, Co, Fe alloys) it was found that, when not combined with other non-metallic alloying agents, between 0.5 and ≤1.0% of oxygen is typically required in the metallic material to limit the hardness loss after heat-treatment of 12 hours at 350° C. to less than 10%. It is worth noting that, unlike the prior art materials (i.e., the teachings of Tajiri '650 and Tajiri '508) which exclusively incorporate O in the deposit from $PO_3^{3-}$ containing compounds added to the electrolyte, the source of O in this Application predominately is the water of the aqueous electrolyte solution.

Unlike in Tajiri '650 and Tajiri '508, where O in the cathodic deposit is exclusively forming a compound with P which precipitates as $PO_3^{3-}$ at the grain boundaries, O in the metallic deposit of this Application is not forming a compound with P, but forms an oxide with any of the metallic elements present, i.e., $MeO_x$, and/or $MeO_xH_y$, wherein Me is a metallic element selected from the group consisting of Co, Cu, Fe, Ni and Zn. According to the present application, there are no phosphorous precipitates at nanocrystalline grain boundaries of the electrodeposited metallic alloy.

The Co, Cu, Fe, Ni and/or Zn-bearing bearing plating solution may also contain one or more sources of S, e.g., organic S-bearing compounds which dissolve in the electrolyte and can get cathodically reduced to elemental S, including, but not limited to, saccharin (3-oxo-2,3-dihydrobenzo[d]isothiazol-1,1-dioxide), available as, e.g., acid saccharin, sodium saccharin, potassium saccharin and calcium saccharin, in a concentration range of between 0.1 to 50 g/L or mol/L. Other examples of a S-donor are cysteine, thiourea, benzene sulfonic acid, 1, 3, 6-naphtaline sulfonic acid (or its Na, K, or Li salt), p-toluenesulfonic acid, sulphonamide, allyl sulfonic acid and coumarins, including, but not limited to, sodium or potassium 7-oxyomegasulfopropyl coumarin, sodium or potassium 7-oxyomegasulfopropyl coumarin and the like. Specially, S-containing organic compounds are purposely added to the electrolyte in this Application as source for the S desired to be incorporated into the metallic material and S does not originate from "unavoidable impurities".

According to Tajiri '508, in paragraph [0053] the concentration of the sulfur in the nickel-cobalt alloy is less than about 250 ppm by weight, and according to paragraph [0060] of Tajiri '508, S may originate from impurities present in the organic grain refining additive.

It has also been reported that sulfur can be co-deposited in metallic materials using electrodeposition, however, in general additions of sulfur are undesired as they cause brittleness and compromise the corrosion behavior. For instance, sulfur, in the form of iron sulfide (FeS), can cause steel to become porous and prone to cracking. Sulfur embrittlement of nickel by grain boundary adsorption of S can cause catastrophic brittle failures of the otherwise ductile Ni, and other metallic alloys, at low stress levels. In addition, sulfur exposure from the environment (air or water) is known to be detrimental to the corrosion behavior of metallic materials. Elemental sulfur, $H_2S$, and $SO_2$ have been reported to significantly increase the corrosion of carbon steels under both aerated and de-aerated conditions in the presence of water. Elemental sulfur deposition on metallic materials used in oil and gas pipelines and facilities has become a major concern due to the increased production of sour oil and natural gas. Consequently, the presence of sulfur in metallic materials or in the environment metallic materials are exposed to has heretofore been usually considered undesirable.

The inventors of the present Application have surprisingly noted that in the case of grain-refined metallic materials, however, very small additions of S, particularly when combined with minor additions of at least one element selected from the group consisting of B, O and P, can actually be beneficial to maintaining the strength/hardness at increased temperatures without unduly compromising other material properties.

Preferably, the B, P, O and/or S-containing donor compounds which are soluble in the electrolyte solution are selected which also provide other beneficial properties to the electroplating solution including, but not limited to, brighteners, grain-refiners, surfactants and levelers.

The Co, Cu, Fe, Ni and/or Zn-bearing plating solution a so typically contains one or more additives selected from the group of surfactants, brighteners, grain-refiners, stress-relievers, and salts to raise the ionic conductivity and adjust the pH. Stress-controlling agents and grain-refiners based on sulfur compounds such as sodium saccharin, coumarin and thiourea may be added in the range of 0 to 10 g/L to control the grain-size/hardness and the stress while providing a convenient source of S. Other suitable grain refiners/brighteners include borates and/or perborates in the concentration range of between 0 and 10 g/L of B while providing a convenient source of B. Sodium, potassium or other chlorides can be added to increase the ionic conductivity of the plating solution and may also act as stress relievers.

A preferred range for the pH value of the plating solution is between 0.5 and 5. Alternatively the plating solution can be alkaline (up to pH 14) containing an excess of complexing agents for the metal ions such as cyanide, ethylenediamine tetraacetic acid (EDTA) or pyrophosphate to prevent precipitation of metal hydroxides. The surface tension of the Co, Cu, Fe, Ni and/or Zn-bearing bearing plating solution may be in a preferred range of 30 to 100 dyne/cm. A preferred temperature range of the Co, Cu, Fe, Ni and/or Zn-bearing plating solution during electrodeposition is between 20 to 120° C.

When using soluble anodes Co-ion, Cu-ion, Fe-ion, Ni-ion and/or Zn-ion depletion in the electrolyte solution is prevented by using Co, Cu, Fe, Ni and/or Zn electrolytic rounds, and/or alloy rounds, as soluble anodes, e.g., retained in Ti anode baskets otherwise metal-ions depletion in the electrolyte solution is prevented by suitable bath additions.

Typically, each anode bag contains only one of the metals and, e.g., in the case of electrodepositing alloys using two metals the current applied between each of the pure metal anodes and the workpiece reflect the alloy composition desired, e.g., in the case of a Ni—Co alloy with a target composition of 35% Co and 64% Ni the current applied between the Ni anode and the workpiece is about 64/99 the current applied between the Co anode and the workpiece, After suitably contacting one or more anodes, which can also be further arranged into individual anode sections, and one or more parts serving as cathode(s), direct or pulsed current (including the use of one or more cathodic pulses, and optionally anodic pulses and/or off times) is applied between the cathode(s) and the anode(s). A suitable duty cycle is in the range of 25% to 100%, preferably between 50 and 100% and suitable applied average cathodic current densities are in the range of 50 to 300 $mA/cm^2$, preferably between about 100 and 200 $mA/cm^2$. This results in deposition rates of between 0.025 and 0.5 mm/h. Agitation rates can also be used to affect the microstructure and the deposit stress and suitable agitation rates range from about to 10 liter per minute and effective cathode or anode area to from about 0.1 to 300 liter per minute and applied Ampere.

By using the electrodeposition process described, Co, Cu, Fe, Ni and/or Zn-comprising coatings can be produced which are ductile, free of cracks, and possess sufficient hardness and residual stress to meet wear and fatigue requirements for wear-resistant coatings. Preferred Co, Cu, Fe, Ni and/or Zn-bearing coatings may comprise Co in the range of about 5 to 95 weight percent; Cu in the range of about 5 to 95 weight percent, Fe in the range of about 5 to 75 weight percent, Ni in the range of about 5 to 95 weight percent, Zn in the range of 35 to 95 weight percent, and B, O, P and/or S combined in the range of about 0.01 to 1.0 weight percent. In addition, embedded in the fine-grained Co, Cu, Fe and/or Ni-comprising coating can be one or more particulates representing between 0-50% per volume of the total metal matrix composite.

Using the process described a preferred Co, Cu, Fe, Ni and/or Zn-comprising coating with up to 1.0%, 1.5% or even 2% of combined B, O, P and/or S, can be electrodeposited. The as-deposited hardness depends on the chemical composition and the average grain-size; however, it typically is in the range of 25 to 900 VHN. To prevent hydrogen embrittlement the deposit can be heat-treated for at least 12 hours, preferably 24 hours at a temperature range of between 175-200° C. Such a heat-treatment can also be employed to melt/decompose a temporary substrate and/or metallizing paint layer to yield an entirely structural, grain-refined article and furthermore, e.g., in the case of Ni—Co alloys, can be conveniently used as the Heat-Treatment Test to determine the change in hardness. Optionally, a further heat-treatment can be employed to increase the deposit Vickers hardness of P and/or B containing grain-refined metallic materials by between 50 and 250 VHN. Most notably, the Co, Cu, Fe, Ni and/or Zn-comprising coatings containing minor additions of B, O, P and/or S according to this specification are particularly suited for use in high-temperature applications. Their temperature stability can be characterized by the hardness of said electrodeposited metallic alloy layer after heat-treatment for 12 hours in an inert atmosphere at a temperature of 350° C. when the total combined Co, Fe and Ni content of the metallic material is at least 50% per weight, 200° C. when the total Cu content of the metallic material is at least 50% per weight, and 100° C. when the total Zn content of the metallic material is at least 50% per weight. The preferred metallic material retains at least 90% of the as-deposited hardness, preferably at least 95% of the as-deposited hardness and most preferably 100% of the as-deposited hardness.

As highlighted above, the inventors of the present Application discovered that only small additions of non-metallic additives are required to stabilize the nanocrystalline grain-size of the noted metallic materials. The total amount of non-metallic additives depends on a number of factors. For instance, it was noted that the grain-size of binary or ternary alloys containing at least 5% of another metal can be more readily stabilized than a single, relatively pure, metal. In addition, it was noted that the smaller the as deposited grain-size is, the higher the concentrations of non-metallic additions are required to stabilize the grain structure. Average grain-sizes below 500 nm typically require more non-metallic additions to stabilize compared to the same composition having average grain-sizes greater than 500 nm Furthermore, relying on two or more non-metallic additions to stabilize the grain-size also minimizes the total amount of non-metallic additives required to meet the temperature stability requirement, thereby minimizing undesired changes in the material property such as reduced ductility and/or reduced corrosion resistance.

The preference for binary or ternary or even quaternary alloys containing at least 5% of each metal can be conveniently accomplished using electrodeposition from a single electrolyte solution by simply varying the electrical parameters, as desired. Embodiments where the electroplated compositions are comprised of a plurality of thin layers of alternating hard and soft materials laminated together, the electrodeposited composition may display Koehler toughening. That form of toughening results from a deflection of a nascent crack at the layer interface due to differing elastic moduli. Nano-laminates can absorb the energy that typically causes cracking and prevent or substantially delay bulk material failure. In addition, nano-laminates can provide for enhanced strength, ductility and fracture toughness and wear.

An exemplary metallic material may be a nickel-cobalt alloy which may include from 40% to 90% by weight nickel, from 10% to 60% by weight cobalt, from 100 ppm to 20,000 ppm by weight combined of phosphorus, boron, oxygen and sulfur, and less than 1% by weight of all impurities which include less than 75 ppm phosphorous.

The concentration of nickel in the nickel-cobalt alloy may be from 40% to 90% by weight, such as from 50% to 80% by weight, such as from 60% to 70% by weight. The concentration of nickel in the nickel-cobalt alloy may be at least 20% by weight, such as at least 40% by weight, such as at least 60% by weight, such as at least 70% by weight, or such as at least 80% by weight. The concentration of nickel in the nickel-cobalt alloy may be less than 90% by weight, such as less than 80% by weight, such as less than 75% by weight, such as less than 70% by weight, such as less than 60% by weight, or such as less than 50% by weight.

The concentration of cobalt in the nickel-cobalt alloy may be from 10% to 60% by weight, such as from 20% to 50% by weight, such as from 25% to 45% by weight. The concentration of cobalt in the nickel-cobalt alloy may be at least 10% by weight, such as at least 20% by weight, such as at least 25% by weight, such as at least 30% by weight, such as at least 40% by weight, or such as at least 50% by weight. The concentration of cobalt in the nickel-cobalt alloy may be less than 60% by weight, such as less than 50% by weight, or such as less than 40% by weight.

In one embodiment the metallic material comprises Ni and/or Co in a range independently selected from 5% to 10%, 7.5% to 15%, 10% to 20%, 12.5% to 25%, from 20% to 40%, from 35% to 70%, from 60% to 95%, from 90% to 99%, P and/or B in a range independently selected from 500 ppm to 1,000 ppm, 750 ppm to 3,000 ppm, 1,000 ppm to 5,000 ppm, 1,500 ppm to 10,000 ppm, O in a range independently selected from 100 ppm to 500 ppm, 300 ppm to 750 ppm, 500 ppm to 1,000 ppm, 750 ppm to 3,000 ppm, S in a range independently selected from 100 ppm to 500 ppm, 300 ppm to 750 ppm, 500 ppm to 1,000 ppm, 750 ppm to 3,000 ppm, up to 1% unavoidable impurities including less than 75 ppm phosphorous and the balance, if any, being at least one metallic element selected from the group consisting of Cu, Zn and Fe.

An exemplary metallic material may be a nickel-iron alloy or a cobalt-iron alloy or nickel-cobalt-iron alloy which may include from 10% to 90% by weight nickel and/or cobalt, from 10% to 90% by weight iron, from 100 ppm to 20,000 ppm by weight combined of phosphorus, boron, oxygen and sulfur, and less than 1% by weight of all impurities.

The concentration of nickel and/or cobalt in the nickel-iron alloy, cobalt-iron alloy or nickel-cobalt-iron alloy may be from 10% to 90% by weight, such as from 20% to 80% by weight, or such as from 40% to 60%. The concentration of nickel and/or cobalt in the nickel-iron alloy, cobalt-iron alloy or nickel-cobalt-iron alloy may be at least 10% by weight, such as at least 25% by weight, such as at least 50% by weight, such as at least 75% by weight, or such as at least 80% by weight. The concentration of nickel and/or cobalt in the nickel-iron alloy, cobalt-iron alloy or nickel-cobalt-iron alloy may be less than 90% by weight, such as less than 80% by weight, such as less than 75% by weight, such as less than 70% by weight, such as less than 60% by weight, or such as less than 50% by weight.

The concentration of iron in the nickel-iron alloy, cobalt-iron alloy or nickel-cobalt-iron alloy may be from 5% to 75% by weight, such as from 10% to 30% by weight, or such as from 30% to 60% by weight. The concentration of iron in the nickel-iron alloy, cobalt-iron alloy or nickel-cobalt-iron alloy may be at least 5% by weight, such as at least 10% by weight, such as at least 25% by weight, such as at least 30% by weight, such as at least 40% by weight, or such as at least 50% by weight. The concentration of iron in the nickel-iron alloy, cobalt-iron alloy or nickel-cobalt-iron alloy may be less than 70% by weight, such as less than 60% by weight, or such as less than 50% by weight.

The concentration of iron in the metallic material may be independently selected from 5% to 10%, 7.5% to 15%, 10% to 20%, 12.5% to 25%, from 20% to 40%, from 35% to 70%, P and/or B in a range independently selected from 500 ppm to 1,000 ppm, 750 ppm to 3,000 ppm, 1,000 ppm to 5,000 ppm, 1,500 ppm to 10,000 ppm, O in a range independently selected from 100 ppm to 500 ppm, 300 ppm to 750 ppm, 500 ppm to 1,000 ppm, 750 ppm to 3,000 ppm, S in a range independently selected from 100 ppm to 500 ppm, 300 ppm to 750 ppm, 500 ppm to 1,000 ppm, 750 ppm to 3,000 ppm, up to 1% unavoidable impurities and the balance being at least one metallic element selected from the group consisting of Ni, Co, Cu, and Zn.

An exemplary metallic material may be a nickel-copper alloy or a cobalt-copper alloy or nickel-cobalt-copper alloy which may include from 10% to 90% by weight nickel and/or cobalt, from 10% to 90% by weight copper, from 100 ppm to 20,000 ppm by weight combined of phosphorus, boron, oxygen and sulfur, and less than 1% by weight of all impurities.

The concentration of nickel and/or cobalt in the nickel-copper alloy or cobalt-copper alloy or nickel-cobalt-copper alloy may be from 5% to 95% by weight, such as from 10% to 80% by weight, or such as from 20% to 60%. The concentration of nickel and/or cobalt in the nickel-copper alloy or cobalt-copper alloy or nickel-cobalt-copper alloy may be at least 5% by weight, such as at least 10% by weight, such as at least 15% by weight, such as at least 25% by weight, or such as at least 50% by weight. The concentration of nickel and/or cobalt in the nickel-copper alloy or the cobalt-copper alloy or the nickel-cobalt-copper alloy may be less than 95% by weight, such as less than 75% by weight, such as less than 50% by weight, such as less than 25% by weight, such as less than 15% by weight, or such as less than 10% by weight.

The concentration of copper in the nickel-copper alloy or cobalt-copper alloy or nickel-cobalt-copper alloy may be from 5% to 95% by weight, such as from 10% to 90% by weight, or such as from 30% to 60% by weight. The concentration of copper in the nickel-copper alloy or the cobalt-copper alloy or the nickel-cobalt-copper alloy may be at least 5% by weight, such as at least 25% by weight, such as at least 50% by weight, such as at least 75% by weight, such as at least 80% by weight, or such as at least 90% by weight. The concentration of copper in the nickel-copper alloy or the cobalt-copper alloy or the nickel-cobalt-copper alloy may be less than 95% by weight, such as less than 90% by weight, or such as less than 75% by weight.

An exemplary metallic material may be a nickel-zinc alloy or a cobalt-zinc or nickel-cobalt-zinc alloy which may include from 5% to 90% by weight nickel and/or cobalt, from 10% to 95% by weight zinc, from 100 ppm to 20,000 ppm by weight combined of phosphorus, boron, oxygen and sulfur, and less than 1% by weight of all impurities.

The concentration of nickel and/or cobalt in the nickel-zinc, cobalt-zinc or nickel-cobalt-zinc alloy may be from 5% to 90% by weight, such as from 10% to 75% by weight, or such as from 5% to 25%. The concentration of nickel and/or cobalt in the nickel-zinc, cobalt-zinc or nickel-cobalt-zinc alloy may be at least 5% by weight, such as at least 7.5% by weight, such as at least 10% by weight, such as at least 15% by weight, or such as at least 20% by weight. The concentration of nickel and/or cobalt in the nickel-zinc, cobalt-zinc or nickel-cobalt-zinc alloy may be less than 90% by weight, such as less than 75% by weight, such as less than 25% by weight, such as less than 20% by weight, such as less than 15% by weight, or such as less than 10% by weight.

The concentration of zinc in the nickel-zinc, cobalt-zinc or nickel-cobalt-zinc alloy may be from 5% to 95% by weight, such as from 10% to 90% by weight, or such as from 25% to 75% by weight. The concentration of zinc in the nickel-zinc, cobalt-zinc or nickel-cobalt-zinc alloy may be at least 5% by weight, such as at least 25% by weight, such as at least 50% by weight, such as at least 75% by weight, such as at least 80% by weight, or such as at least 90% by weight. The concentration of zinc in the nickel-zinc, cobalt-zinc or nickel-cobalt-zinc alloy may be less than 95% by weight, such as less than 90% by weight, or such as less than 80% by weight.

An exemplary metallic material may be an iron-zinc alloy which may include from 5% to 35% by weight iron, from about 65% to about 95% by weight zinc, from about 100 ppm to 20,000 ppm by weight combined of phosphorus, oxygen and sulfur, and less than 1% by weight of all impurities.

The concentration of iron in the iron-zinc alloy may be from 5% to 35% by weight, such as from 5% to 25% by weight, such as from 7.5% to 20% by weight, or such as from about 10% to about 27.5% by weight. The concentration of iron in the iron-zinc alloy may be at least 1% by weight, such as at least 5% by weight, such as at least 10% by weight, such as at least 15% by weight, or such as at least 20% by weight. The concentration of iron in the iron-zinc alloy may be less than 35% by weight, such as less than 25% by weight, such as less than 20% by weight, such as less than 17.5% by weight, such as less than 15% by weight, or such as less than 10% by weight.

The concentration of zinc in the iron-zinc alloy may be from 60% to 95% by weight, such as from 70% to 95% by weight, or such as from 80% to 95% by weight. The concentration of zinc in the iron-zinc alloy may be at least 60% by weight, such as at least 70% by weight, such as at least 80% by weight, or such as at least 90% by weight. The concentration of zinc in the iron-zinc alloy may be less than 95% by weight, such as less than 90% by weight, or such as less than 80% by weight.

Another exemplary metallic material may be a copper-zinc alloy which may include from 40% to 90% by weight copper, from 10% to 60% by weight zinc, from 100 ppm to 20,000 ppm by weight combined of phosphorus, boron, oxygen and sulfur, and less than 1% by weight of all impurities.

The concentration of copper in the copper-zinc alloy may be from 40% to 90% by weight, such as from 50% to 80% by weight, such as from 60% to 70% by weight. The concentration of copper in the copper-zinc alloy may be at least 40% by weight, such as at least 50% by weight, such as at least 60% by weight, such as at least 70% by weight, or such as at least 80% by weight. The concentration of copper in the copper-zinc alloy may be less than 90% by weight, such as less than 80% by weight, such as less than 75% by weight, such as less than 70% by weight, such as less than 60% by weight, or such as less than 50% by weight.

The concentration of zinc in the copper-zinc alloy may be from 10% to 60% by weight, such as from 20% to 50% by weight, such as from 25% to 45% by weight. The concentration of zinc in the copper-zinc alloy may be at least 10% by weight, such as at least 20% by weight, such as at least 25% by weight, such as at least 30% by weight, such as at least 40% by weight, or such as at least 50% by weight. The concentration of zinc in the copper-zinc alloy may be less than 60% by weight, such as less than 50% by weight, or such as less than 40% by weight.

The concentration of phosphorus (P) and/or boron (B) in the metallic material (each or combined) may be in a range independently selected from 100 ppm to 20,000 ppm by weight, such as from 100 ppm to 15,000 ppm, such as from 100 ppm to 10,000 ppm, such as from 500 ppm to 5,000 ppm, such as from 1,000 ppm to 3,500 ppm. The concentration of phosphorus (P) and/or boron (B) in the metallic material (each or combined) may be at least 100 ppm by weight, such as at least 300 ppm, such as at least 400 ppm, such as at least 500 ppm, such as at least 750 ppm, such as at least 1,000 ppm, such as at least 1,500 ppm, such as at least 2,000 ppm, such as at least 5,000 ppm, such as at least 7,500 ppm, such as at least 10,000 ppm, or such as at least 15,000 ppm by weight. The concentration of phosphorus (P) and/or boron (B) in the metallic material (each or combined) may be less than 20,000 ppm by weight, such as less than 15,000 ppm, such as less than 10,000 ppm, such as less than 7,500 ppm, such as less than 5,000 ppm, such as less than 2,500 ppm, or such as less than 1,000 ppm. The balance being at least one metallic element selected from the group consisting of Ni, Co, Cu, Fe, and Zn.

The concentration of the sulfur (S) and/or oxygen (O) in metallic material (each or combined) may be in a range independently selected from 100 ppm to 10,000 ppm by weight, such as from 100 ppm to 5,000 ppm, such as from 100 ppm to 1,000 ppm, such as from 300 ppm to 10,000 ppm such as from 300 ppm to 5,000 ppm, such as from 300 ppm to about 2,500 ppm.

The concentration of sulfur (S) and/or oxygen (O) in the metallic material (each or combined) may be at least 100 ppm by weight, such as at least 250 ppm, such as at least 300 ppm, such as at least 350 ppm, such as at least 400 ppm, such as at least 500 ppm, such as at least 7500 ppm, such as at least 1,000 ppm, such as at least 1,500 ppm, such as at least 2,000 ppm, such as at least 5,000 ppm, such as at least 7,500 ppm, such as at least 10,000 ppm, or such as at least 15,000 ppm by weight. The concentration of sulfur (S) and/or oxygen (O) in the metallic material (each or combined) may be less than 15,000 ppm by weight, such as less than 10,000 ppm, such as less than 7,500 ppm, such as less than 5,000 ppm, such as less than 2,500 ppm, such as less than 2,000 ppm, such as less than about 1,500 ppm, such as less than about 1,000 ppm, such as less than about 750 ppm, or such as less than 500 ppm. The metallic material may also contain P and/or B in the concentrations listed above, the balance being at least one metallic element selected from the group consisting of Ni, Co, Cu, Fe, and Zn.

While alloys comprising two or more elements selected from the group consisting of Co, Cu, Ni, Fe and Zn are generally preferred due to the enhanced thermal stability of alloys, as noted above, metallic materials according to the current Application may also comprise a single metal. In this case, e.g., when using up to 99.9% unalloyed Co, Cu, Ni, Fe and Zn the amount of non-metallic elements selected from the group consisting of B, O, P and S may be somewhat higher than the amount required to stabilize a binary, ternary or quaternary alloy comprising these elements. As highlighted above, addition of particulates can also be used to form metal matrix composites and further enhance the temperature stability.

In one embodiment the metallic material comprises an average grain-size in a range independently selected from 10 nm to 1,000 nm, 25 nm to 1,000 nm, 50 nm to 1,000 nm, 50 nm to 750 nm, 75 nm to 500 nm, or 100 nm to 400 nm.

As highlighted above, the inventors have also noted that, at times, it can be beneficial for the grain-refined metallic material not to have homogeneous properties in all three dimensions, such as chemical composition, microstructure and physical composition such as strength, resilience, ductility, thickness, etc.

It is known that, e.g., increasing amounts of B and/or P will enhance the corrosion resistance of the metallic material, however, compromising physical properties such as strength and ductility. Therefore, it may be desired to form electrodeposits with higher B and/or P content on or near the exposed surfaces. Similarly, any element selected from the group consisting of B, S, P and O, while enhancing the temperature stability, can compromise ductility.

By using electrodeposition, grading and/or layering in the deposition direction can conveniently be achieved using a single plating tank and electroplating solution and by suitably modulating the electrodeposition parameters. Thus, the cross-section in the deposition reaction can be optimized for whatever properties are desired and by suitably selecting the appropriate layer/sublayer thicknesses.

In addition to composition, microstructure and the like at times it is desirable to control the overall coating thickness distribution of the metallic layer. The person skilled in the art knows that electrodeposition does not necessarily result in a uniform thickness distribution of the metallic coating, dependent on a number of parameters, including, but not limited to, size and shape of the work piece. In certain applications the need arises to imprint a predetermined coating thickness profile along and across a complex article that is being electroplated. The goal may be to provide a uniform thickness distribution, e.g., in the case of coating silicon wafer workpieces, alternatively, it may be desired to increase and/or decrease the coating thickness along the length of an article, to optimize the strength to weight ratio, e.g., in the case of complex parts used in transportation or other applications where the overall weight of the part needs to be kept as low as possible.

Frequently and depending on use parts require differences in material properties along its length. For example, in areas of increased strain it may be desirable to increase the thickness, in areas of bends in the parts subject to flexing or erosion during use, and/or in locations where parts are attached to other structures (e.g., air ducts in a jet engine which may be fastened to the main engine support structure at their respective ends via, e.g., flanges, and may be supported at one or more locations along its length, e.g., by retaining brackets to minimize vibration).

A predetermined thickness distribution along the workpiece length can be achieved by suitably placing one or more auxiliary anodes powered by independent power supplies and not powered from the same power supply as the main anode(s), the use of current thieves and stationary shields to suitably control and/or modify the local current density and current density distribution on the workpiece. Furthermore, the use of poorly electrically conductive and non-conductive temporary or permanent substrates allows modulation of metallic material properties in the deposition direction and along its length by strategically locating one or more electric contact points to the workpiece and modulating the electrodeposition parameters in addition to naturally creating a workpiece with constantly "varying electrical conductivity" which can also be used in material property grading in the deposition direction and/or along the length of the workpiece by applying current limited, constant voltage deposition profile.

At the beginning of the electrodeposition, due to the limited electrical conductivity of the workpiece the $V_{max}$, $I_{max}$ parameters are suitably chosen (based on part size and conductivity) that initially voltage regulation will prevail, i.e., the cell voltage will reach the $V_{max}$, and the initial deposition current (and current density) remains small (see FIG. 2). With increasing plating time the deposition thickness of the metallic material increases, the overall electrical conductivity of the surface increases, due to corresponding drop in the Ohmic resistance, and the current (and current density) will start to increase (as the applied voltage remains constant) which results in a gradual change of deposit material properties, including, but not limited to, the chemical composition, grain-size and ductility. This ramping of the current and modulating of the layer property in the deposition reaction by in-situ varying the intrinsic resistivity of the deposit will continue until the preset $I_{max}$ is reached at which point plating switches from a constant voltage to a constant current regime. In the constant current electroplating mode, the material properties (chemical and physical) remain the same. For simplicity, FIG. 2 depicts a DC current, however, a pulse current including a reverse pulse current can be imposed on top of the generic $V_{max}/I_{max}$ plating schedule. Similarly, it may be desirable to repeat $V_{max}/I_{max}$ schedules, i.e., start with a lower $V_{max}$ and $I_{max}$ to avoid burning of the deposit and stepwise increase $I_{max}$ and/or $V_{max}/I_{max}$ in one or several more additional steps. As typically the current density controls the chemical composition and grain-size, the person skilled in the art will appreciate that at least during each $V_{max}$ phase the deposit will be graded in the deposition direction, whereas in the $I_{max}$ plating phase the deposit properties will not vary by much (at least in areas experiencing the same local current density).

Figure 3:
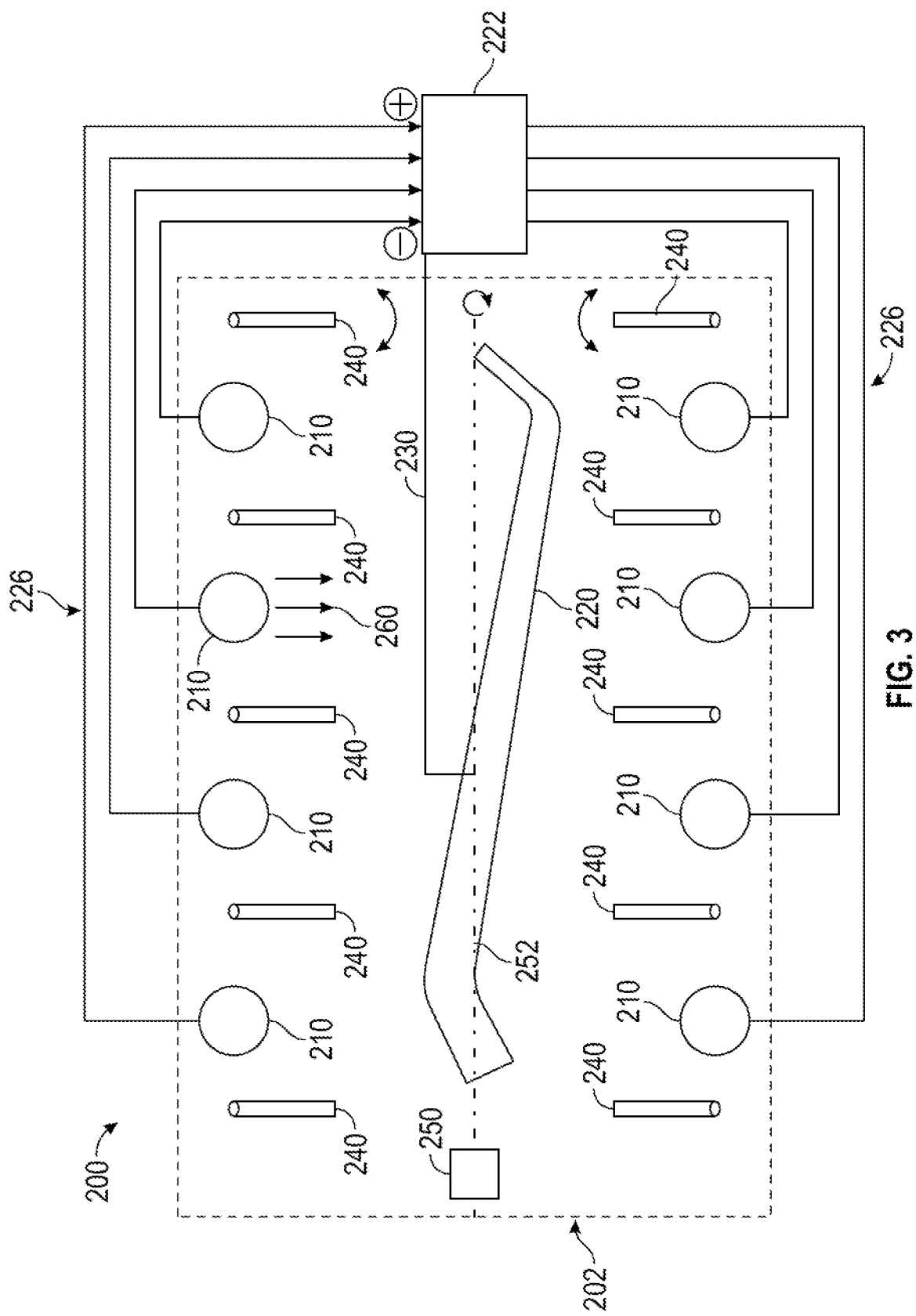
FIG. 3 is a schematic view of an electroplating system according to one embodiment of the present invention.

Electroplating/Electroforming System Description:

FIG. 3 shows a schematic top plan view of an electroplating system 200 according to one embodiment of the present invention capable of providing coatings with superior control over the coating thickness along the length of an elongated, complex-shaped, article. The system can be used to provide a uniform coating thickness along the entire length of the article or to impart a desired thickness distribution to provide for additional strength in desired areas of the part, thereby minimizing the weight of the part and any post-processing operation, e.g., machining, grinding, etc.

The electroplating system 200 includes an electroplating tank 202 containing multiple soluble and/or dimensionally stable anodes 210, at least one workpiece 220, a controllable power source (i.e., central control module) 222 with multiple, independently regulated channels, respective anode electrical current leads 226 connecting each independently controllable power supply channel with the respective anodes 210, at least one negative lead 230, connecting each independently regulated channel of the controllable power supply 222 with the workpiece 220 and a number of electrically non-conductive deflectors 240 placed parallel to, i.e., in line with, the current flow and/or the natural electric field (see arrows 260) between the anodes and the workpiece, capable of oscillating at angle of up to +/−67.5° (preferably between +/−45° or +/−) 22.5° from the natural electronic and/or ionic flow direction between said anodes and the workpiece at a rate of between 0 and 10 oscillations per minute, preferably between 0.1 and 1 oscillations per minute.

The anodes 210 can be soluble anodes composed of one or more metallic materials selected from the group consisting of Co, Cu, Fe, Ni and Zn and the workpiece 220 is a metallic or metallized substrate having the appropriate size and form of the desired part. It may also be desired to further subdivide anodes, e.g., provide one of the soluble anodes with one metallic material and a second of the soluble anodes with another metallic material and use separate synchronized power supplies to provide the desired "equivalent total anode section current" while the ratio between the individual anode currents of the soluble anodes reflects approximately the composition ratio of the respective metals desired in the deposit in order to adequately replenish the respective metal ion in solution and keep their concentrations relatively constant. Alternatively, dimensionally stable anodes (DSAs) can be used. The anodes can be spaced at equal distance to the centerline of the workpiece, however, if desired, e.g., depending on the shape and size of the workpiece, selected anodes can be spaced closer and selected ones can be spaced further away from the centerline of the workpiece.

The workpiece 220 can be a sizeable object (e.g., at least 1 ft long), it can be a symmetrically or irregularly shaped, elongated article comprising a permanent substrate to dictate the shape and size or, a temporary substrate, which merely defines the desired shape and size to be removed after completion of electroforming the metallic layer(s). Optionally, a rotator 250 rotates the workpiece 220 about an axis of rotation 252 against the anodes 210 at between 0 and 25 rpm, preferably between 0.5 and 5 rpm. The axis of the rotation 252 of the workpiece 220 preferably is kept within +/−22.5 degrees from perpendicular to the direction of the electric field, i.e., the angle between the axis of the rotation of the workpiece and the electric field direction between the anodes and the workpiece in the plating cell may be kept between 67.5 degrees and 112.5 degrees, unlike in the case of, e.g., electroplating a silicon waver, where the rotation direction is typically parallel to the direction of the electric field, i.e., the angle between the axis of the workpiece rotation and the electric field direction in the plating cell is kept close to 0 degrees.

The programmable power source 222 connects the anodes 210 and the cathode/workpiece 220 to establish the natural electric field between the anodes 210 and the workpiece 220, as indicated by arrows 260. The power source has multiple channels that are synchronized to ensure on-times, off-times as well as forward and reverse pulse times are occurring at exactly the same time when using a pulse plating schedule. The current density, i.e., the height of the forward and reverse pulses, however, may be modulated independently to affect the thickness profile, as desired.

In accordance with the present invention, the deflectors 240 are disposed between the anodes 210, controlled by different power supply modules and the workpiece 220 to selectively vary or modulate the time-averaged current density of the electric field 260 between the anodes and specific locations along the workpiece 220. The deflectors 240 can be shaped and sized identically or may be varying in size and shape, the distance between the deflectors and the workpiece 220 and the respective anode(s) can be the same or may be differed as can be the position of the deflectors relative to the workpiece and anodes. Deflectors are typically solid, flat sheets, but can also take on different shapes, if desired. In specific applications, deflectors can be perforated to or contain some openings/open sections to facilitate constant mixing of the solution, however, the effect of openings or perforations on the electric field and throwing power need to be considered. Deflectors employed in the electroplating tank can all have the same size or shape or can vary, e.g., the deflectors at the outer ends of the plating cell, for a variety of reasons, may not match the remaining deflectors in size and shape. In case of electroplating an irregular shaped workpiece it may also be desirable to use deflectors of various shapes and sizes to specifically reflect the workpiece geometry and obtain the electric field desired in each section along the workpiece. Deflectors can extend the entire height of the electrolyte, i.e., from the bottom of the tank 202 to the surface; however, typically they do not extend the full electrolyte height, i.e., there can be space left at the bottom of the tank for plumbing and to let debris settle, similarly at the top deflectors do not necessarily need to protrude the electrolyte level. Deflectors do not necessarily need to extend the entire distance between the anodes and the workpiece as long as deflectors are sized and positioned between anodes and the workpiece to effectively direct and modify the natural electric field applied on the workpiece, as described. Deflectors typically oscillate at the same speed, direction and angle; however, depending on the complexity of the workpiece it may be desirable to individually control the oscillation parameters of each deflector.

Each deflector is preferably made of a non-conductive material that is resistant to the electrolyte solution and can be made of polyethylene, polypropylene, fluoropolymers (e.g., Teflon®, PVC, PE, PP or polyvinylidene fluoride (PVDF). Mechanical brackets or collars as well as means of oscillation (not shown in the figure) can be used to position each deflector in the electroplating cell as desired. Thus, each deflector can be easily removed or modified as required and, further, can be easily retrofitted to existing electroplating systems.

The electroplating system typically also contains a fluid inlet outlet pump, filter(s), eductors, heaters, shield(s), current thieves, additional power supplies, etc. (not shown in the figure).

The deflectors are all immersed in the same electrolyte solution and at least somewhat restrict/divert and/or direct the natural electric field present between each separately controlled anode(s) and a particular point/section along the workpiece surface. By using this approach, the local electroplating rate along the workpiece surface is controlled to a desired level thereby controlling the chemical composition, microstructure and the thickness profile of the electrodeposited metallic material along the length and width of the plating surface of the workpiece. Optionally, the deflectors can be adjusted in position relative to the workpiece and anodes, e.g., to stepwise or continuously modulate the angle between the deflectors and the direction of the natural electric field to minimize thickness changes in the "transition zones" between respective "electric field zones". For instance, the deflectors can be orientated in parallel to the natural electric field direction, defined as the direction of the electric field without use of deflectors (0 degree angle relative to the natural electric field), perpendicular to the natural electric field direction (90 degree angle relative to the natural electric field) or any angle in between, Preferably, the deflectors are orientated close to parallel to the natural electric field direction and, in one preferred embodiment; the deflectors are not stationary but continuously oscillate at a rate of between 0.1 and 10.0 (and up to 100) degrees per minute between a maximum of about −45 degrees and +45 degrees to the natural electric field to even the deposit thickness in the transition areas between respective electrolytic throwing power zones. Typically, deflectors positioned between each set of anodes and the workpiece are aligned in direction, and oscillate at the same speed and to the same angles, i.e., each set of deflectors aligned on one side operate in parallel, however, each deflector can also be operated independently at separate speeds to any desired min/max angle.

The thickness profile of the electrodeposited metallic layer along the workpiece can thus be selectively controlled by the shape and position of the deflectors and the applied current density of the individual power supply modules regardless of the throwing power of the electrolyte. Given the description provided, the person skilled in the art of electrodeposition will realize the near unlimited options the use of deflectors provides to affect the local current density and deposit thickness and properties along the length of the workpiece as compared to the prior art which predominantly relied on merely modulating the electrical parameters on the power supplies.

The person skilled in the art of galvanic processes will appreciate that, while above description focuses on using the novel apparatus for electrodeposition, the same set up can advantageous be used for electropolishing and electromachining operations, i.e., galvanic processes where the workpiece is the anode and material is anodically dissolved and removed.

Figure 4:
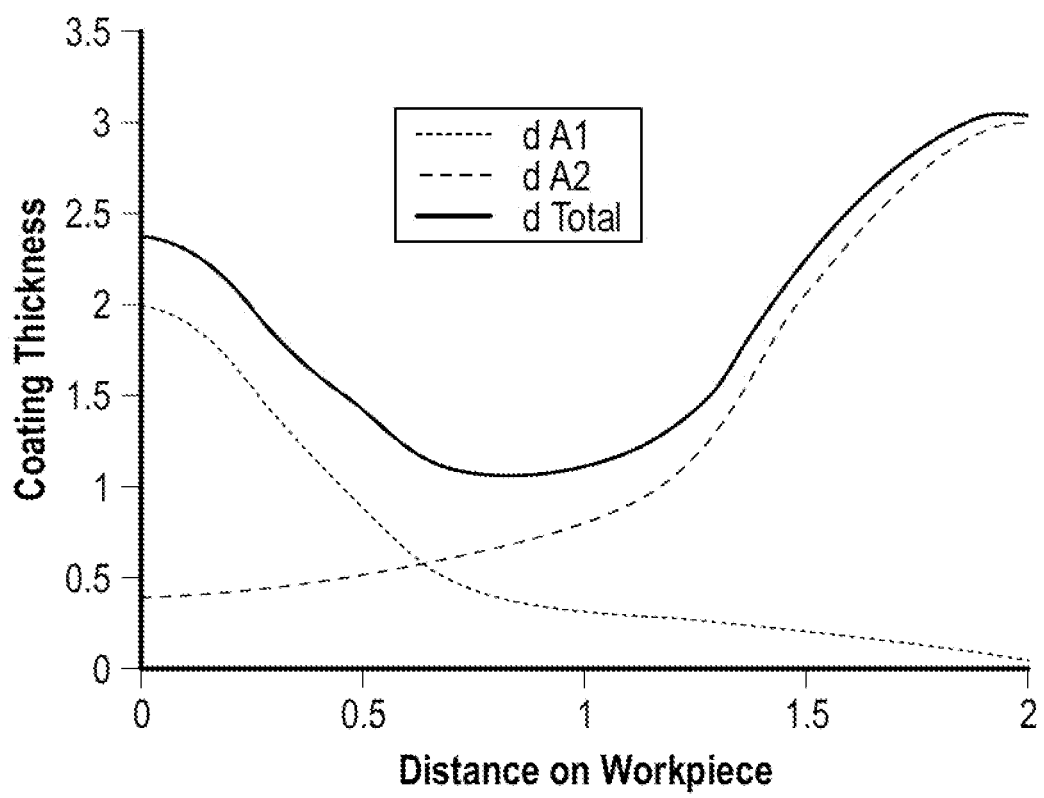
FIG. 4 shows the total coating thickness and the thickness contribution from two adjacent anode loops operating at different applied currents in a conventional plating tank according to the prior art.

FIG. 4 shows the total coating thickness and the thickness contribution along the length of a workpiece (i.e., a straight tube rotating around its longitudinal axis) from two adjacent anode loops operating different applied currents in a conventional plating tank according to the prior art, similar to the exemplary electroplating system as depicted in FIG. 3 employing multiple anodes, however without the use of deflectors. Depending on a myriad of factors including, but not limited to applied current density, electrolyte composition, anode-cathode distance, inter-anode distances, throwing power, ionic and electrical conductivity, agitation rate, cathodic efficiency as well as temperature, the first anode loop, positioned at position 0 along the workpiece length at a predetermined anode/cathode gap, operating alone at the applied current $I_{A1}$ results in a thickness distribution along the length of the workpiece, indicated as "d A1" in FIG. 4. Similarly, the thickness distribution along the length of the workpiece, indicated as "d A2" in FIG. 4 depicts a second anode loop, positioned at position 2 along on the workpiece length at a predetermined anode/cathode gap, adjacent to the first anode loop, when operating alone at the applied current $I_{A2}$ (with $I_{A2}=1.5\times I_{A1}$) results in a thickness distribution along the length of the workpiece, indicated as "d A2". Powering both anode loops at the same time at the applied currents $I_{A1}$ and $I_{A2}$ results in the total thickness distribution along the length of the workpiece, indicated as "d total". As the coating thickness (in accordance with the local current distribution) drops along the workpiece with increasing distance from position 0 and position 2, respectively, the coating thickness distribution along the length of the workpiece varies significantly, e.g., the ratio between the maximum coating thickness and the minimum coating thickness is almost 3:1 which may necessitate overplating and grinding back to achieve the desired thickness along the entire length of the workpiece.

Figure 5:
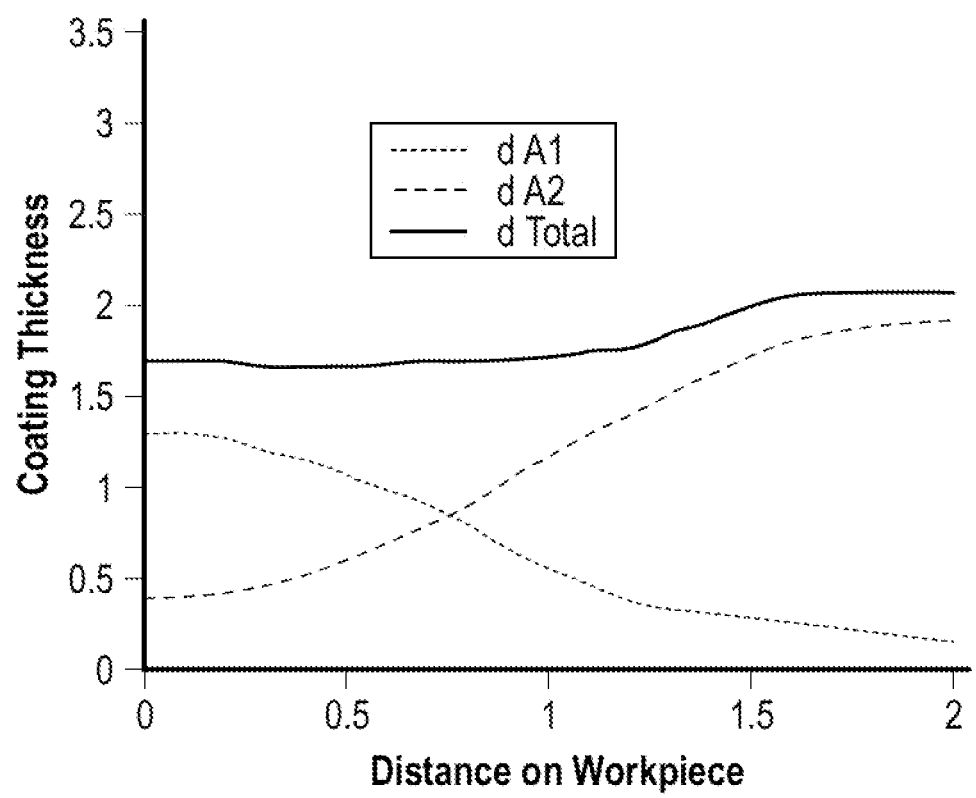
FIG. 5 shows the total coating thickness and the thickness contribution from two adjacent anode loops operating at different applied currents in a plating tank employing synchronized deflectors oscillating by +/−45 degrees versus the natural electric field direction according to one embodiment of the invention.

In contrast, FIG. 5 shows the total coating thickness and the thickness contribution along the length of a workpiece (i.e., a straight tube rotating around its longitudinal axis) from two adjacent anode loops operating at different applied currents in a plating tank according to a preferred embodiment, specifically the electroplating system as depicted in FIG. 3 employing multiple anode loops operating at predetermined applied currents, employing synchronized deflectors oscillating in parallel by +/−45 degrees versus the natural electric field direction, with one deflector position at the half-way point between each anode. Specifically, in this example, the deflectors of FIG. 3 are located at position −1 (beyond the length of the workpiece shown in FIG. 5), position 1 and position 3 (beyond the length of the workpiece shown in FIG. 5), and the deflectors oscillate at the same speed and are synchronized at the same relative angle against the natural electric field, i.e., they oscillate in parallel to each other. Accordingly, the applied electric fields on the workpiece constantly change, as does the coating thickness and current density distribution (as well as the chemical composition and microstructure) along the length of the workpiece. The first anode loop, positioned at position 0 along on the workpiece length at a predetermined anode/cathode distance/gap, operating alone at the applied current $I_{A1}$ results in a thickness distribution along the length of the workpiece, indicated as "d A1" in FIG. 5. Similarly, the thickness distribution along the length of the workpiece, indicated as "d A2" in FIG. 5 depicts a second anode loop, with the next anode positioned at position 2 along on the workpiece length at a predetermined anode/cathode gap, adjacent to the first anode loop, when operating alone at the applied current $I_{A2}$ (with $I_{A2}=1.5\times I_{A1}$) results in a thickness distribution along the length of the workpiece, indicated as "d A2". Powering both anode loops at the same time at the applied currents $I_{A1}$ and $I_{A2}$ results in the total thickness distribution along the length of the workpiece, indicated as "d total". As can be seen in FIG. 5 the coating thickness distribution along the length of the workpiece gradually increases from exposure to the electric field predominantly covered by Anode loop 1 to the electric field predominantly covered by anode loop 2, achieving the desired gradual increase in coating thickness along the entire length of the workpiece with a transition zone of gradual coating thickness increase form the first coating thickness to the second (greater) coating thickness, as desired based on the differences in applied currents, but without the "coating thickness trough" resulting in a zone with a thin coating as obtained in the control experiment without the use of deflectors.

Comparing the anode thickness profiles $d_{A1}$ of FIG. 4 with $d_{A1}$ of FIG. 5, which use the same applied currents (and the same Ah throughput) and have the same layout regarding the tank, anodes, workpiece, etc., apart from the fact that FIG. 5 uses oscillating deflectors while FIG. 4 applies no mechanical means in the tank to direct the electrical field, it becomes apparent that using the deflectors, when synchronized and moving in parallel, as described, lower the maximum and raise the minimum coating thickness along the same length of the workpiece as they vary and move the local applied current density along the length of the workpiece, i.e., in this example, the deflectors "dampen", "even out", and "level" the individual thickness profile and furthermore grade the deposit. This approach can also be conveniently employed, e.g., when the workpiece changes in outer diameter along its length, yet it is desired to keep the coating thickness uniform, requiring the applied local current density to gradually increase as the outside area increases with the increase of the OD. If, on the other hand, it is desired to build up thickness in local areas, adjacent deflectors can oscillate towards each-other, i.e., limiting the throwing power and lateral local current density leading to a steeper coating thickness profile and accordingly coating high spots along the workpiece. Based on this disclosure, the person skilled in the art will appreciate that size, placement and oscillation parameters (speed, angle, synchronized or changing using independently parameters) can be employed to achieve, within reason, almost any desired local current density and thickness distribution along the length of a workpiece. This approach becomes even more valuable in achieving desired thickness distributions when the workpieces are complex in shape, i.e., not a "simple" straight tube of uniform thickness as used in this example and/or elongated articles of changing outer diameter where the objective is to maintain a uniform coating thickness along its entire length. The person skilled in the art will also understand that, as the applied currents through the two anode loops and the resulting charge/Ah in both set ups is the same, the total amount of cathodic deposits in both systems is about the same, i.e., the total deposit weight matches in both examples. The thickness distribution, however, is drastically different between the two approaches illustrating the impact of mechanically modulating the electric field by using non-stationary deflectors, as described. The addition of deflectors, as described, therefore provides the electroplating engineer with a new and powerful tool to affect cathodic deposit thickness distributions in addition to the known effects of varying the applied current, using square wave pulsing (e.g. using a reverse pulse to "shave off" high points in the deposit and even out the thickness distribution), and the employ of current thieves and shields.

In yet another preferred embodiment the electrical conductivity of the workpiece itself can be used to achieve the desired control of the thickness distribution of the metallic coating along the workpiece surface. If the workpiece has a poor conductivity and/or the metallized layer(s) are kept thin a significant Ohmic loss can occur along the workpiece when making electrical contact to the workpiece at one end only. Accordingly, the coating thickness near the electrical contact area will be the highest, dropping off more and more as the distance from the contact area on the workpiece increases. In this case multiple electrical contacts to the workpiece can be made in areas where a thicker layer is desired thus modulating the thickness distribution along the length of the article even without the use us deflectors and multiple power supplies. For example, in the case of a tube or tubular shaped conduit used in a combustion engine to any fluid, it may be desirable to increase the wall thickness at the respective ends where the tube is fastened to the remaining structure as well as at least at one point along its length where, e.g., a bracket may be used to further secure the tube to apparatus structure to minimize vibration and/or oscillation as experienced during operation.

Figure 6:
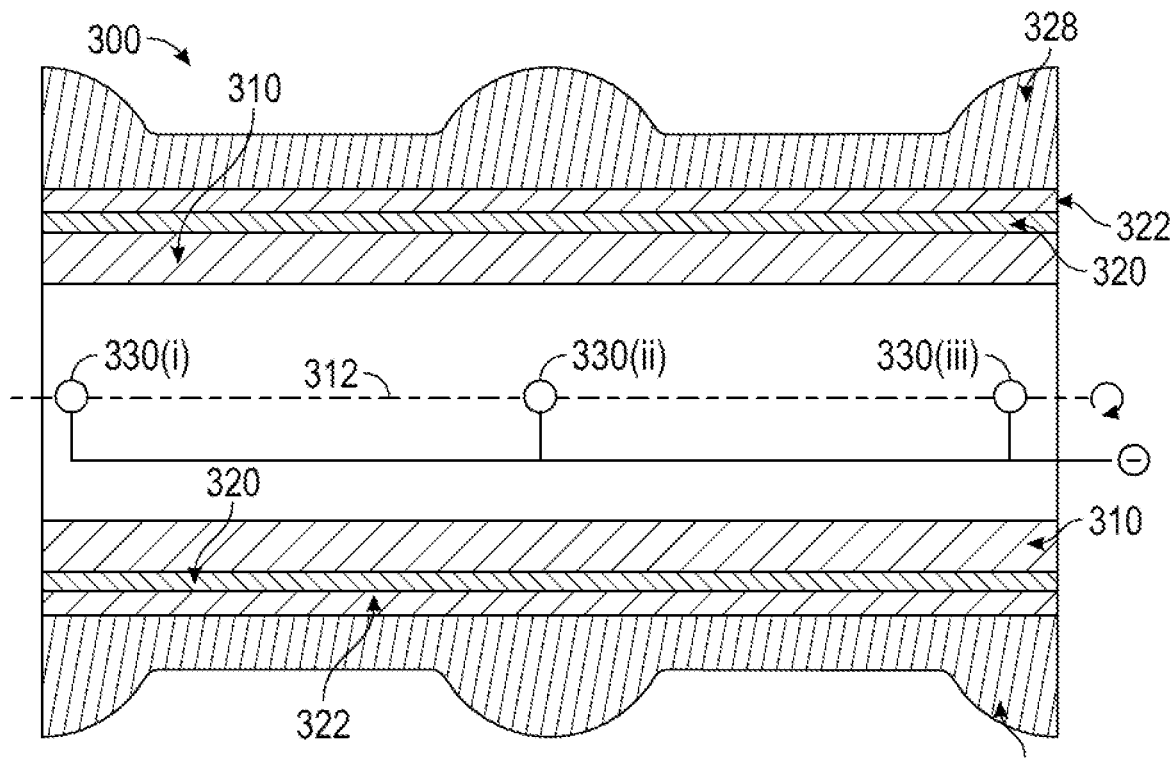
FIG. 6 is a schematic cross-sectional view of another preferred embodiment of the invention containing at least one metallic coating of varying thickness on a poorly conductive substrate.

Specifically, to FIG. 6, it depicts a conceptual cross-sectional view of an article 300 according to another preferred embodiment of the invention containing a grain-refined metallic coating of varying thickness to provide for additional strength in desired areas of the part, thereby minimizing the weight of the part and any post-processing operation, e.g., machining, grinding, etc. A workpiece substrate 310 is a temporary substrate comprising a non-conductive polymer tube (e.g., a reusable inflatable or smart memory polymer mandrel, about 4 feet in length with an OD of about 4 inches) that has been metallized with an about 2 micron thick layer of electroless nickel (amorphous Ni-8P), depicted as the metallizing layer 320, followed by an about 5 micron thick layer of coarse-grained acid copper, depicted in 322, and at least one grain-refined metallic layer 328 of varying thickness in the deposition direction along the length of the tube. The substrate 310 is rotatable about a rotation of axis 312.

Also depicted in FIG. 6 are the three distinct negative electrical connection points for making electrical connections to the substrate 310 at locations 330(*i*), 330(*ii*), and 330(*iii*). To highlight the important parameters, the remaining components required to establish a functional electroplating system are not shown in the figure.

By providing one or more electrical contacts points along the metallized non-conductive workpiece and/or by appropriate placing one or more anodes in the plating cell (e.g., lining up anodes with the electrical contact points on the workpiece), gradients in the local current density can be achieved almost at will and can be used to change the local composition and thickness, e.g., in areas of the workpiece exposed to increased stress during use in a convenient way. The area around each of the workpiece electrical contact points will experience increased current densities and thus the layer thickness along the workpiece length can be varied.

The finished tube is to be installed as a gas conduit in a commercial application exposed to a maximum temperature of 350° C. and is attached to the system at the respective ends and at the halfway point along the length of the tube to minimize vibrations. As such it is desired to increase the wall thickness of the conduit at all mounting points (the two ends and the mounting point halfway). Typically, heretofore, varying thickness profiles on such a workpiece would have been achieved using electroforming by overplating the entire structure followed by a mechanical operation (machining, grinding, etc.) to remove excess material. This approach is costly, generates waste and furthermore, in case the wall thickness of the workpiece is relatively thin and subject to flexing, forces applied while grinding the undesired material away may collapse the entire structure and may actually be impractical, if not impossible. Therefore, a fabrication process is desired that does not necessarily require a mechanical operation to achieve the final dimensions. As the electrical conductivity of the metallized layers is rather low, contacting the metallized mandrels at the three locations where the increased wall thickness is required, due to the lateral Ohmic drop between the contact points, will result in a current density distribution along the workpiece that is narrow and the highest near the electrical contact point and laterally drops until it rises again because of the proximity to the next electrical contact point. Consequently, early on in the electrodeposition most cathodic deposition and coating thickness build-up occurs in these three regions with relatively low Ohmic resistance near the contact points and do not extend very far laterally. With increased plating time, the coating thickness and the electrical conductivity increase, causing the lateral Ohmic loss to drop (at the same applied current) and the current density distribution along the length of the workpiece to change accordingly, i.e., the zone of metal deposition of significance (e.g., the zone where the applied local current density is at least 10% or more of the maximum local current density) slowly widens and causes the coating thickness profile to develop as indicated in FIG. 6, assuming the workpiece is being rotated during the plating operation and that the necessary anodes are in place along the entire workpiece so there are no anodic current density limitations to consider. If the electrolytic bath is selected to deposit an alloy, the local current density distribution changes will result in corresponding changes in alloy composition and microstructure/hardness, i.e., a very simple and elegant process is used to vary the thickness distribution, chemical composition and microstructure along the length of the workpiece without further intervention, i.e., changing electrical conductivity of the workpiece with increased plating time is used to modulate the thickness, composition and grain-size of the electroplated layer(s).

By providing one or more electrical contact points along the metallized poorly-conductive workpiece and/or by appropriate placement of one or more anodes in the plating cell, gradients in the local current density can be achieved almost at will and can be used to change the local composition, thickness and microstructure, e.g., in areas of the workpiece exposed to increased stress. The area around each of the workpiece electrical contact points will experience increased current densities (resulting in a smaller grain-size and higher hardness) and the layer thickness along the workpiece length can be varied reducing or eliminating the need for "overplating" and machining the part back to the desired dimensions afterwards. In this context, a change in thickness of the electrodeposited layer along specific sections of the length of the workpiece can be at least 10%, 25%, 50% or 100% of the minimum thickness or the average thickness (as determined by average weight of the coating over the plated surface area).

Current density modulation can also be used to affect the chemical stability, e.g., metallic coatings with a higher P and/or B content are typically more corrosion resistant and therefore a higher P and/or B content at or near (within 25 microns) of the exposed surface when compared to the average or bulk composition can be used to further optimize the properties of the metallic layer(s).

Further aspects of the invention are provided by the subject matter of the following clauses:

1. An apparatus for electrodepositing a metallic material on at least one elongated temporary or permanent substrate, said apparatus comprising:
   (a) an electroplating cell filled with an electrolyte solution containing ions of the metallic material(s) to be deposited;
   (b) the at least one elongated substrate forming an elongated workpiece,
   (c) optionally means for rotating the elongated substrate around its longitudinal axis,
   (d) at least two (or at least three) anodes substantially aligned with each other,
   (e) at least two electrical power sources configured to each supply electrical power to one of said at least two anodes and the elongated substrate, at least one non-conductive deflector plate at least partially immersed in the electrolyte but not extending all the way to the electrolyte well bottom placed between two adjacent anodes oriented substantially in parallel to the natural electric field and capable of being moved relative to the direction of the natural electric field;
   (g) each said non-conductive deflector plate capable of oscillating at an angle between up to +67.5 degrees and −67.5 degrees versus the natural electric field at a speed of 0-12 oscillations per minute;
   (h) wherein the deflector plates at least partially direct the negative charge and divert the natural electric field on the elongated substrate along its length to affect the local current density and the deposit thickness along the length of said elongated substrate.

2. The apparatus according to the preceding clause, wherein the power supplies are synchronized with respect to at least one of: their on-time, off-time, and reverse pulse time.
3. The apparatus according to any preceding nonconflicting clause, wherein said power sources are configured to apply a multi-step schedule to said elongated substrate to modulate at least one deposition parameter selected from the group consisting of thickness, composition and microstructure of the electrodeposited metallic material layers.
4. The apparatus according to of any preceding nonconflicting clause, further comprising a central control module which is configured in such a way that the central control module imprints synchronized plating schedules to said at least two power sources.

The apparatus according to of any preceding nonconflicting clause, wherein said non-conductive deflector plates are perforated.
6. The apparatus according to any preceding nonconflicting clause, wherein said non-conductive deflector plates are synchronized with respect to direction and angular movement.
7. The apparatus according to any preceding nonconflicting clause, wherein said non-conductive deflector plates are used for electrolyte agitation.
8. The apparatus according to any preceding nonconflicting clause, where the electrodeposition parameters are selected so that all said electrodeposited metallic material layer has the same thickness along the length of said elongated workpiece and the difference between the maximum and/or minimum layer thickness to the average layer thickness is less than 25%.
9. The apparatus according to any preceding nonconflicting clause, where the electrodeposition parameters are selected so that all said electrodeposited metallic material layer has a varying thickness along the length of said elongated substrate and the difference between the maximum and/or minimum layer thickness to the average layer thickness is greater than 25%.
10. The apparatus according to any preceding nonconflicting clause, wherein the elongated substrate is selected from the group consisting of rod, tube, shaft, gun barrel, and a complex shaped elongated article.

Additional aspects of the invention are provided by the subject matter of the following clauses:
1. Method for electrodepositing a metallic material layer on at least one elongated temporary or permanent substrate which defines an elongated substrate, the method comprising the steps of:
    (a) providing an electroplating cell filled with electrolyte solution containing ions of the metallic material(s) to be deposited;
    (b) at least partially immersing each said elongated substrate and, substantially in parallel to its longitudinal axis, at least one anode in the electrolyte solution;
    (c) providing one or more non-conductive deflector plates at least partially immersed in the electrolyte but not extending all the way to the electroplating cell bottom between two adjacent anodes, said non-conductive deflector plates oriented substantially in parallel to the natural electric field and/or approximately perpendicular to the longitudinal axis of said elongated substrate, said non-conductive deflector plates capable of being moved relative to the direction of the natural electric field and/or the longitudinal axis of said elongated substrate, each said non-conductive deflector plates capable of oscillating at an angle of up to +67.5 degrees to −67.5 degrees versus the natural electric field at a speed of 0-12 oscillations per minute thereby being able to divert the natural electric field and able to change the local current density on the elongated substrate;
    (d) supplying electrical power from at least one electrical power supply to said elongated substrate and to said at least one anode;
    (e) setting and/or regulating electrodepositing parameters;
    (f) supplying a negative charge to said elongated substrate to electrodeposit a coherent metallic material layer; and
    (g) after completion of the electrodeposition removing each said elongated substrate from the electroplating cell.
2. The method according to the preceding clause, wherein said non-conductive deflector plates are perforated.
3. The method according to any preceding nonconflicting clause, wherein movement of said non-conductive deflector plates alters the electric field applied along the elongated substrate.
4. The method according to any preceding nonconflicting clause, wherein movement of said non-conductive deflector plates is synchronized.
5. The method according to any preceding nonconflicting clause, wherein movement of said non-conductive deflector plates is synchronized to move in parallel with each other.
6. The method according to any preceding nonconflicting clause, wherein movement of said non-conductive deflector plates is synchronized to move towards each other on part of the stroke and away from each other on another part of the stroke.
7. The method according to any preceding nonconflicting clause comprising at least two anodes and at least two electrical power supplies and simultaneously and independently supplying electrical power from the at least two electrical power supplies to said elongated substrate and to each of said at least two anodes;
8. The method according to any preceding nonconflicting clause, comprising a central control module capable of imprinting synchronized plating schedules independently to the at least two electrical power supplies.
9. The method according to the preceding clause, wherein the electrical power supplies are synchronized with respect to at least one of: their on-time, off-time, and reverse pulse time.
10. The method according to any preceding nonconflicting clause, wherein the forward and/or reverse current, if used, varies between at least two directly adjacent anodes and the elongated substrate.
11. The method according to any preceding clauses, where the electrodepositing parameters are selected so that said electrodeposited metallic material layer has the same composition and thickness along the length of said elongated substrate.
12. The method according to any preceding clauses, where the electrodepositing parameters are selected so that all said electrodeposited metallic material layer has the same thickness along the length of said elongated workpiece and the difference between the maximum and/or minimum layer thickness to the average layer thickness is less than 25%.

13. The method according to any preceding nonconflicting clause, where the electrodepositing parameters are selected so that all said electrodeposited metallic material layer has a varying thickness along the length of said elongated substrate and the difference between the maximum and/or minimum layer thickness to the average layer thickness is greater than 25%.
14. The method according to any preceding nonconflicting clause, where the elongated substrate is rotated around its longitudinal axis.

Additional aspects of the invention are provided by the subject matter of the following clauses:
1. Method for electrodepositing a metallic material layer on at least one elongated temporary or permanent substrate having an electrical conductivity of less than 10 S/m at 20° C. along its length, the at least one substrate defining an elongated workpiece, the method comprising the steps of:
   (a) providing an electroplating cell filled with electrolyte solution comprising containing ions of the metallic material(s) to be deposited;
   (b) at least partially immersing each said elongated substrate and, substantially in parallel to its longitudinal axis, at least two anodes in the electrolyte solution;
   (d) providing at least two distinct electric contact points for supplying electrical power to said poorly-conductive, elongated substrate;
   (d) simultaneously and independently supplying electrical power from at least one electrical power supply to said distinct electrical contact points on the elongated substrate;
   (e) setting electrodepositing parameters to include at least one specified maximum voltage limit and at least one specified maximum current limit;
   (f) supplying a negative charge to said substrate to electrodeposit a coherent metallic material layer with a thickness profile where the layer thickness at and/or near the electric contact points on said elongated substrate is at least 20% thicker than the minimum layer thickness along the length of said elongated workpiece; and
   (g) removing said elongated substrate from said plating cell.
2. The method according to the preceding clause, providing one or more non-conductive deflector plates at least partially immersed in the electrolyte but not extending all the way to the electrolyte cell bottom between two adjacent anodes, said non-conductive deflector plates oriented substantially in parallel to the natural electric field and/or perpendicular to the longitudinal axis of said elongated substrate, said non-conductive deflector plates capable of being moved relative to the direction of the natural electric field and/or the longitudinal axis of said elongated substrate, each said non-conductive deflector plate capable of oscillating at an angle of up to +67.5 degrees to −67.5 degrees versus the natural electric field at a speed of 0-12 oscillations per minute.
3. The method according to any preceding nonconflicting clause, wherein movement of said non-conductive deflector plates is synchronized.
4. The method according to any preceding nonconflicting clause, wherein movement of said non-conductive deflector plates is synchronized to move in parallel with each other.
5. The method according to any preceding nonconflicting clause, wherein movement of said non-conductive deflector plates is synchronized to move towards each other on part of the stroke and away from each other on another part of the stroke.
6. The method according to any preceding nonconflicting clause, comprising a central control module capable of imprinting synchronized plating schedules independently to the at least two electrical power supplies.
7. The method according to any preceding nonconflicting clause, wherein the electrical power supplies are synchronized with respect to at least one of: their on-time, off-time, and reverse pulse time.
8. The method according to any preceding nonconflicting clause, wherein the forward and/or reverse current, if used, varies between at least two directly adjacent electrical power supplies.
9. The method according to any preceding nonconflicting clause, where the electrodepositing parameters are selected so that all said electrodeposited metallic material layer has a varying thickness along the length of said elongated substrate and the difference between the maximum and/or minimum layer thickness to the average layer thickness is greater than 25%.
10. The method according to any preceding nonconflicting clause, where the elongated substrate is rotated around its longitudinal axis.
11. The method according to any preceding nonconflicting clause, where the electrodepositing parameters are initially set to one specified maximum voltage limit and one specified maximum current limit and, after the maximum current limit is reached and maintained for a specified period of time, the electrodepositing parameters are set to another specified maximum voltage limit and another specified maximum current limit.
12. The method according to any preceding nonconflicting clause, where the electrodepositing parameters are set in a way that any subsequent specified maximum voltage limit is lower than the previous specified maximum voltage limit and any subsequent maximum current limit is higher than any previous specified maximum current limit.

Variations

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:
1. An article comprising:
   a heterogeneous electrodeposited metallic alloy layer, a composition of the metallic alloy layer consisting of:
   (i) a microcrystalline grain structure with an average grain-size in the range of 2 to 1,000 nm;
   (ii) at least two metallic elements selected from the group consisting of Co, Cu, Fe, Ni and Zn;
   (iii) each of said metallic elements comprising at least 5% per weight of the metallic alloy composition;
   (iv) a non-metallic element consisting of P comprising between 100 ppm and 20,000 ppm per weight of the metallic alloy composition, wherein P is in elemental form having an oxidation state of zero, and is an alloying element with the electrodeposited metallic alloy layer;
   (v) at least one additional non-metallic element comprising between 50 ppm and 20,000 ppm per weight of the metallic alloy composition selected from the group consisting of B, O, P and S;

(vi) particulates in the range of 0 to 95% per volume;
(vii) wherein said heterogeneous electrodeposited metallic alloy layer being compositionally graded and/or layered in the deposition direction;
(viii) wherein the concentration of at least one of the chemical elements varies by at least 5% in the deposition direction and/or along a length of the article; and
(ix) wherein the at least one additional non-metallic element includes O, the metallic alloy composition includes $[PO3]^{3-}$ and less than 75 ppm of P is present in the form of $[PO3]^{3-}$.

2. The article of claim 1, wherein a thickness of said heterogeneous electrodeposited metallic alloy layer in the deposition direction is in the range of between 25 microns and 2.5 cm, and wherein the thickness is non-uniform along the length of the article, the layer thickness varying by at least 25 microns and/or at least 10% between a layer location with an increased thickness and a layer location with a reduced thickness.

3. The article of claim 1, wherein said heterogeneous electrodeposited metallic alloy layer is layered in the deposition direction and comprises at least 25 sublayers with directly adjacent layers varying in composition of at least one element by at least 5%.

4. The article of claim 1, wherein the heterogeneous electrodeposited metallic alloy layer comprises Co and Ni.

5. The article of claim 4, wherein the heterogeneous electrodeposited metallic alloy layer contains B.

6. The article of claim 4, wherein the heterogeneous electrodeposited metallic alloy layer contains S, and P and S comprising combined between 0.1% and 1% per weight of the heterogeneous electrodeposited metallic alloy layer.

7. The article of claim 6, wherein S comprises at least 300 ppm per weight of the heterogeneous electrodeposited metallic alloy layer.

8. The article of claim 4, wherein the heterogeneous electrodeposited metallic alloy layer comprises S and/or B, and wherein the hardness of said heterogeneous electrodeposited metallic alloy layer after heat-treatment for 12 hours at a temperature of 350° C. in an inert atmosphere retains at least 90% of the as-deposited hardness.

9. The article of claim 4, wherein the heterogeneous electrodeposited metallic alloy layer comprises B, and wherein the hardness of said electrodeposited metallic alloy layer, after heat-treatment for 12 hours at a temperature of 350° C. in an inert atmosphere, retains at least 100% of the as-deposited hardness.

10. The article of claim 4, wherein the heterogeneous electrodeposited metallic alloy layer comprises B, and wherein the hardness of said electrodeposited metallic alloy layer, after heat-treatment for 12 hours at a temperature of 350° C. in an inert atmosphere, retains at least 90% of the as-deposited hardness.

11. The article of claim 1, wherein the heterogeneous electrodeposited metallic alloy layer further contains particulate additions representing between 1 and 30% per volume of the heterogeneous electrodeposited metallic alloy layer.

12. The article of claim 1, wherein the heterogeneous electrodeposited metallic alloy layer comprises Fe and at least one of Ni and Co.

13. The article of claim 1, wherein the heterogeneous electrodeposited metallic alloy layer comprises Cu and at least one of Ni and Co.

14. The article of claim 1, wherein the heterogeneous electrodeposited metal is alloy layer comprises Zn and at least one of Ni and Co.

15. The article of claim 1, wherein the heterogeneous electrodeposited metallic alloy layer where the non-metallic elements of B and S, if present, form alloying agents with the electrodeposited metallic alloy layer and are present in the oxidation state of zero in the as-deposited metallic alloy layer.

16. The article of claim 15, wherein the heterogeneous electrodeposited metallic alloy layer contains no particulate additions.

17. The article of claim 1, wherein the heterogeneous electrodeposited metallic alloy layer, as deposited, contains oxygen having an oxidation state of −II and forming a metal oxide $MeO_x$ or a metal oxi-hydroxide $MeO_xH_y$, with x and y<1, where Me is an electrodeposited metallic element selected from the group consisting of Co, Cu, Fe, Ni and Zn.

18. The article of claim 1, wherein the heterogeneous electrodeposited metallic alloy layer contains no particulate additions.

19. An elongated article comprising:
(i) a substrate defining a size and a shape of the article, the substrate comprising a polymeric material with or without particulate addition having an electrical conductivity of <1 S/m at 20° C.;
(ii) at least one electrically conductive metallizing layer in intimate contact with the polymeric material and having a thickness of no more than 12.5 microns and having an electrical conductivity of >$10^4$ S/m at 20° C.;
(iii) at least one electrically conductive intermediate layer in intimate contact with the metallizing layer, the at least one conductive intermediate layer having a thickness of no more than 25 microns and having an electrical conductivity of ≥$10^4$ S/m at 20° C.;
(iv) a structural metallic material layer in intimate contact with the metallizing layer or the conductive intermediate layer and having a thickness of at least 25 microns and an electrical conductivity of ≥$10^6$ S/m at 20° C.;
(v) the structural metallic material layer comprising a heterogeneous electrodeposited metallic alloy layer consisting of:
(a) a microcrystalline grain structure with the average grain-size in the range of 2 to 1,000 nm;
(b) at least two metallic elements selected from the group consisting of Co, Cu, Fe, Ni and Zn;
(c) each of said at least two metallic elements comprising at least 5% per weight of the total metallic alloy composition;
(d) at least one non-metallic element selected from the group consisting of B, O, P and S;
(e) said non-metallic elements in total comprising between 50 ppm and 10,000 ppm per weight of the total metallic alloy composition;
(f) wherein the hardness of said electrodeposited metallic alloy layer after heat-treatment for 12 hours at a temperature of 100° C. in an inert atmosphere retains at least 90% of the as-deposited hardness;
(g) wherein said heterogeneous electrodeposited metallic alloy layer being compositionally graded and/or layered in the deposition direction;
(h) wherein at least one of the chemical elements varies by at least 5% in the deposition direction and/or along a length of the article; and
(i) wherein the electrodeposited metallic alloy layer comprises P and O, P is in elemental form having an oxidation state of zero and is an alloying element with the electrodeposited metallic alloy layer, the metallic alloy composition includes $[PO3]^{3-}$ and less than 90 ppm of P is present in the form of $[PO3]^{3-}$;
  (i) wherein the heterogeneous electrodeposited metallic alloy layer contains no particulate additions.

20. The article of claim 19, wherein the substrate is a temporary substrate which is removed after electrodeposition to form a free-standing article.

21. The article of claim 19, wherein a thickness of said heterogeneous electrodeposited metallic alloy layer in the deposition direction is in the range of between 25 microns and 2.5 cm, and wherein the thickness is non-uniform along the length of the article, the layer thickness varying by at least 25 microns and/or at least 10% between a layer location with an increased thickness and a layer location with a reduced thickness.

22. The article of claim 19, wherein said heterogeneous electrodeposited metallic alloy layer is layered in the deposition direction and comprises at least 25 sublayers having a thickness in the range of 25 nm to 250 nm with directly adjacent layers varying in composition of at least one element by at least 5%.

23. The article of claim 19, wherein the heterogeneous electrodeposited metallic alloy layer comprises Co and Ni.

24. The article of claim 19, wherein the heterogeneous electrodeposited metallic alloy layer where the non-metallic elements of B and S, if present, form alloying agents with the electrodeposited metallic alloy layer and are present in the oxidation state of zero in the as-deposited metallic alloy layer.

25. The article of claim 19, wherein the heterogeneous electrodeposited metallic alloy layer, as deposited, contains oxygen having an oxidation state of –II and forming a metal oxide $MeO_x$ or a metal oxi-hydroxide $MeO_xH_y$, with x and y<1, where Me is an electrodeposited metallic element selected from the group consisting of Co, Cu, Fe, Ni and Zn.

26. An article comprising:
  a heterogeneous electrodeposited metallic alloy layer, a composition of the metallic alloy layer consisting of:
    (i) a microcrystalline grain structure with an average grain-size in the range of 2 to 1,000 nm;
    (ii) two metallic elements consisting of Co and Ni, and each of said metallic elements comprising at least 5% per weight of the metallic alloy composition;
    (iii) a non-metallic element consisting of P comprising between 100 ppm and 20,000 ppm per weight of the metallic alloy composition, wherein P is in elemental form having an oxidation state of zero, and is an alloying element with the electrodeposited metallic alloy layer;
    (iv) particulates in the range of 0 to 95% per volume;
    (v) wherein said heterogeneous electrodeposited metallic alloy layer being compositionally graded and/or layered in the deposition direction;
    (vi) wherein the concentration of at least one of the chemical elements varies by at least 5% in the deposition direction and/or along a length of the article; and
    (vii) wherein if the composition of the metallic alloy layer includes at least one additional non-metallic element consisting of O comprising between 50 ppm and 20,000 ppm per weight of the metallic alloy composition, the metallic alloy composition includes $[PO3]^{3-}$ and less than 75 ppm of P is present in the form of $[PO3]^{3-}$.

* * * * *